(12) United States Patent
Stamm et al.

(10) Patent No.: US 7,546,246 B1
(45) Date of Patent: Jun. 9, 2009

(54) METHODS AND SYSTEMS FOR CHANGE INITIATIVE MANAGEMENT

(75) Inventors: M. Patrick Stamm, Duluth, GA (US); Dani Hopkins-Robertson, Marietta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1663 days.

(21) Appl. No.: 10/178,760

(22) Filed: Jun. 25, 2002

(51) Int. Cl.
*G06F 17/50* (2006.01)

(52) U.S. Cl. .......................................... 705/7
(58) Field of Classification Search ............... 705/7
See application file for complete search history.

(56) References Cited

U.S. PATENT DOCUMENTS 6,578,004 B1 * 6/2003 Cimral et al. .................. 705/7

OTHER PUBLICATIONS

Gilbert et al (Anticipation and Managing three dilemmas in knowledge management), 2002, Yale School of Management; pp. 1-26.*
Burstein et al (An approach to Mixed-Initiative Management of Heterogeneous Software Agent Teams), 1999, pp. 1-10.*
Heindel et al (Customer-Focussed Initiative Management: Reengineering the Process), Dec. 1993, IEEE, pp. 1-5.*
Burstein et al (Mixed-Initiative Tasking and Management of Software Agent Teams), Dec. 1999, American Association for Artificial Intelligence). pp. 1-4.*

* cited by examiner

*Primary Examiner*—Romain Jeanty
(74) *Attorney, Agent, or Firm*—Withers & Keys, LLC

(57) ABSTRACT

Embodiments of the present invention relate to systems and methods for change initiative management. In an embodiment, a method for initiative management includes identifying and defining an initiative and developing a business case for the initiative. The business case includes an initiative scorecard. The method also includes generating an initiative plan for the initiative. The initiative plan including an initiative risk assessment. The method furthermore includes managing execution of the initiative and evaluating execution and management of the initiative.

19 Claims, 35 Drawing Sheets

Initiative Summary

| Initiative Title | | |
|---|---|---|
| Supported Customer Rule | - Please Select One - | |
| Date Submitted | | |
| Business Case Due Date | | |
| Project Start Date | | Project End Date |
| Project Duration (if dates not known) | | |

| Main Contact | Phone | iPage |
|---|---|---|
| Additional Contact | Phone | iPage |
| Additional Contact | Phone | iPage |

Initiative Details

*Initiative Description:*

*Additional Comments:*

*Major Milestones:*

- 
- 
- 
- 
- 
-

*Additional Comments:*

Organizations Involved and Required Supporters:

| Organization | Required Supporter |
|---|---|
|  |  |
|  |  |
|  |  |
|  |  |
|  |  |
|  |  |

*Additional Comments:*

FIG. 2A

*Background and Current Situation:*

*Additional Comments:*

*Benefits:*

- 
- 
-

*Additional Comments:*

*High Level Areas of Impact:*

*Areas/Activities that Will Impact the Initiative*

*Impacts the Initiative Will Have On Other Areas/Activities*

*Impacts the Initiative Will Have On the Customer*

*Additional Comments:*

*Potential Required Resources:*

| Skill/Knowledge Required | Area/COU Represented | Name and Contact Info (if known) |
|---|---|---|
|  |  |  |
|  |  |  |
|  |  |  |
|  |  |  |
|  |  |  |
|  |  |  |
|  |  |  |

*Additional Comments:*

FIG. 2B

*Estimated Cost To Implement:*

*Additional Comments:*

*Barriers to Success:*

- 
- 
- 
-

*Additional Comments:*

*Action Plan:*

| # | Activity | Who Is Responsible | Target Dates | | Output/Result |
|---|----------|--------------------|--------|-------|---------------|
|   |          |                    | Start  | Due   |               |
|   |          |                    |        |       |               |
|   |          |                    |        |       |               |
|   |          |                    |        |       |               |
|   |          |                    |        |       |               |
|   |          |                    |        |       |               |
|   |          |                    |        |       |               |
|   |          |                    |        |       |               |
|   |          |                    |        |       |               |
|   |          |                    |        |       |               |
|   |          |                    |        |       |               |
|   |          |                    |        |       |               |
|   |          |                    |        |       |               |

*Additional Comments:*

Please attach any additional documentation required for the Initiative Summary Document as an appendix.

FIG. 2C

Business Case

| Initiative Title | |
|---|---|
| Supported Customer Rule | Please Select One: |
| Date Submitted | |
| Project Start Date | Project End Date |

Main Contacts

| Project Manager | Phone | iPage |
|---|---|---|
| Additional Contact | Phone | iPage |

Project Team

| Team Member | Role/Responsibility | Organizational Area/COU |
|---|---|---|
| | | |
| | | |
| | | |
| | | |
| | | |

| Purpose of Initiative | Please Select One: | Risk Assessment | PleaseSelect One: |
|---|---|---|---|
| Impact on Customer | Please Select One: | Competitive Impact | Please Select One: |
| Impact on Business | Please Select One: | Is Funding Secured? | Please Select One: |

Executive Summary

Current Situation

Business Objectives

Recommended Solution

FIG. 3A

Quantifiable Benefits

| Benefit | Rationale | Quantified Result |
|---|---|---|
|  |  |  |
|  |  |  |
|  |  |  |
|  |  |  |
|  |  |  |

*Additional Details*

Intangible Benefits

| Benefit | Rationale | Result |
|---|---|---|
|  |  |  |
|  |  |  |
|  |  |  |
|  |  |  |
|  |  |  |

*Additional Details*

Assumptions, Impacts and Risks

*Assumptions*

| Assumption | Source |
|---|---|
|  |  |
|  |  |
|  |  |
|  |  |
|  |  |

*Additional Details*

FIG. 3B

*Impacts*

| Impact | Source |
|---|---|
|  |  |
|  |  |
|  |  |
|  |  |
|  |  |

*Additional Details*

*Risks*

| Risk | Mitigation Strategy |
|---|---|
|  |  |
|  |  |
|  |  |
|  |  |
|  |  |

*Additional Details*

Budget and Costs

What are the major cost components of the initiative?

How is the initiative being funded?

Provide a funding schedule.

FIG. 3C

| Initiative #: | Initiative Name: | | (Enter Init Name Here) | | | Financial Summary | | |
|---|---|---|---|---|---|---|---|---|
| | | 2001 | 2002 | 2003 | 2004 | 2005 | 2006 | Planning total |
| Revenue summary | | | | | | | | |
| New revenue | | $ - | $ - | $ - | $ - | $ - | $ - | $ - |
| Less: cannibalized revenue | | $ - | $ - | $ - | $ - | $ - | $ - | $ - |
| Net incremental revenue | | $ - | $ - | $ - | $ - | $ - | $ - | $ - |
| Total operating rev. (TOR) | | $ - | $ - | $ - | $ - | $ - | $ - | $ - |
| | | | | | | | | |
| Expense summary | | | | | | | | |
| Product (COGS) | | $ - | $ - | $ - | $ - | $ - | $ - | $ - |
| Personnel | | $ - | $ - | $ - | $ - | $ - | $ - | $ - |
| All other expenses | | $ - | $ - | $ - | $ - | $ - | $ - | $ - |
| Less: Identified cost savings | | $ - | $ - | $ - | $ - | $ - | $ - | $ - |
| Total operating expense | | $ - | $ - | $ - | $ - | $ - | $ - | $ - |
| Depreciation | | $ - | $ - | $ - | $ - | $ - | $ - | $ - |
| TOE, including depr. | | $ - | $ - | $ - | $ - | $ - | $ - | $ - |
| | | | | | | | | |
| Contribution summary | | | | | | | | |
| Contribution | | $ - | $ - | $ - | $ - | $ - | $ - | $ - |
| Cumulative contribution | | $ - | $ - | $ - | $ - | $ - | $ - | $ - |
| Present value | | $ - | $ - | $ - | $ - | $ - | $ - | $ - |
| Cumulative present value | | | | | | | | |
| | | | | | | | | |
| Cash flow (after tax) | | $ - | $ - | $ - | $ - | $ - | $ - | $ - |
| Cumulative cash flow | | $ - | $ - | $ - | $ - | $ - | $ - | $ - |
| Present value | | $ - | $ - | $ - | $ - | $ - | $ - | $ - |
| Cumulative present value | | | | | | | | |
| | | | | | | | | |
| Resource requirements summary | | | | | | | | |
| Required expense | | $ - | $ - | $ - | $ - | $ - | $ - | $ - |
| Required capital | | $ - | $ - | $ - | $ - | $ - | $ - | $ - |
| Headcount | | | | | | | | |

FIG. 4A

| (Enter Init Name Here) | | | | | | | Revenue Pro Forma |
|---|---|---|---|---|---|---|---|
| | Driver/unit | 2001 | 2002 | 2003 | 2004 | 2005 | 2006 | Planning total |
| New revenue | | | | | | | | |
| New product or service revenue (non-recurring) | | $ | $ | $ | $ | $ | $ | $ |
| New product or service revenue (recurring) | | $ | $ | $ | $ | $ | $ | $ |
| Cost Avoidance | | $ | $ | $ | $ | $ | $ | $ |
| Other revenues (list out) | | $ | $ | $ | $ | $ | $ | $ |
| Subtotal, new revenue | | $ | $ | $ | $ | $ | $ | $ |
| Less: Cannibalized revenue | | | | | | | | |
| Current revenue stream (by product/customer) | | $ | $ | $ | | | | |
| x % cannibalized by new product/customer | | | | | | | | |
| Cannibalized revenue | | $ | $ | $ | $ | $ | $ | $- |
| Other cannibalized revenue | | $ | $ | $ | $ | $ | $ | $ |
| Subtotal, cannibalized revenue | | $ | $ | $ | $ | $ | $ | $ |
| Total revenue impact | | $ | $ | $ | $ | $ | $ | $ |
| Year over year growth | | | | | | | | |

FIG. 5

| Name: | (Enter Init Name Here) | Revenue Logic & Assumptions |

| # Overall assumptions | | Source: |
|---|---|---|
| 1 Discount rate | 11.38% | These rates should be supplied by Company Long Term Financial Planning. |
| 2 Tax rate | 39% | |
| 3 Base year - | 2002 for planning | |
| 4 Tracking year | 2001 for actual comparison | |

| # Revenue Assumptions | Source: |
|---|---|
| 1 | |
| 2 | |
| 3 | |
| 4 | |
| 5 | |
| 6 | |
| 7 | |
| 8 | |
| 9 | |
| 10 | |

FIG. 6

| (Enter Init Name Here) | | | | | | | Expense Pro Forma |
|---|---|---|---|---|---|---|---|
| | Driver/unit | 2001 | 2002 | 2003 | 2004 | 2005 | 2006 | Planning total |

| | Driver/unit | 2001 | 2002 | 2003 | 2004 | 2005 | 2006 | Planning total |
|---|---|---|---|---|---|---|---|---|
| Product-related | | | | | | | | |
| *One time expenses:* | | | | | | | | |
| One time expense | | - | - | - | $ - | $ - | - | $ - |
| One time expense | | - | - | $ - | $ - | $ - | - | $ - |
| COGS | | - | - | $ - | $ - | $ - | - | $ - |
| Subtotal, one time expense | | $ - | $ - | $ - | $ - | $ - | - | $ - |
| *Recurring costs:* | | | | | | | | |
| Recurring cost | | - | - | $ - | $ - | $ - | - | $ - |
| Recurring cost | | - | $ - | $ - | $ - | $ - | - | $ - |
| Recurring cost | | - | $ - | $ - | $ - | $ - | - | $ - |
| COGS | | - | $ - | $ - | $ - | $ - | - | $ - |
| Subtotal, recurring expense | | $ - | $ - | $ - | $ - | $ - | - | $ - |
| Less: Total cannibalized | | - | $ - | $ - | $ - | $ - | - | $ - |
| Add. Retained revenue | | - | $ - | $ - | $ - | $ - | - | $ - |
| Total product-related | | $ - | $ - | $ - | $ - | $ - | - | $ - |
| Employee-related costs (Examples provided below) | | | | | | | | |
| Headcount additions (#)- mngt | | - | - | - | - | - | - | |
| x average fully loaded cost | | $ - | $ - | $ - | $ - | $ - | - | $ - |
| Subtotal, mngt expense | | $ - | $ - | $ - | $ - | $ - | - | $ - |
| Headcount additions(#)- non mngt | | - | - | - | - | - | - | |
| x average fully loaded cost | | $ - | $ - | $ - | $ - | $ - | - | $ - |
| Subtotal, non-mngt expense | | $ - | $ - | $ - | $ - | $ - | - | $ - |
| Overtime payments | | $ - | $ - | $ - | $ - | $ - | - | $ - |
| Travel | | $ - | $ - | $ - | $ - | $ - | - | $ - |
| Initial training | | $ - | $ - | $ - | $ - | $ - | - | $ - |
| Ongoing training | | $ - | $ - | $ - | $ - | $ - | - | $ - |
| Real estate costs | | $ - | $ - | $ - | $ - | $ - | - | $ - |
| Other employee-related expense | | $ - | $ - | $ - | $ - | $ - | - | $ - |
| Other employee related expense | | $ - | $ - | $ - | $ - | $ - | - | $ - |
| Total employee-related | | $ - | $ - | $ - | $ - | $ - | - | $ - |

FIG. 7A

Expense Pro Forma

| (Enter Init Name Here) | Driver/unit | 2001 | 2002 | 2003 | 2004 | 2005 | 2006 | Planning total |
|---|---|---|---|---|---|---|---|---|
| All other expenses | | | | | | | | |
| Consulting & other professional srvcs. | | $ | $ | $ | $ | $ | - | $ |
| Corporate communications | | $ | $ | $ | $ | $ | - | $ |
| Kickoff awards & other incentives | | $ | $ | $ | $ | $ | - | $ |
| Realistic contingency | | $ | $ | $ | $ | $ | - | $ |
| Other Expense | | $ | $ | $ | $ | $ | - | $ |
| Other Expense | | $ | $ | $ | $ | $ | - | $ |
| Other Expense | | $ | $ | $ | $ | $ | - | $ |
| Other Expense | | $ | $ | $ | $ | $ | - | $ |
| Other Expense | | $ | $ | $ | $ | $ | - | $ |
| Other Expense | | $ | $ | $ | $ | $ | - | $ |
| Total other expenses | | $ | $ | $ | $ | $ | - | $ |
| **Cost savings - *Input as negative numbers only*** | | | | | | | | |
| Technology related savings | | $ | $ | $ | $ | $ | - | $ |
| Personnel-related savings | | $ | $ | $ | $ | $ | - | $ |
| Process related savings | | $ | $ | $ | $ | $ | - | $ |
| Benefit 1 | | $ | $ | $ | $ | $ | - | $ |
| Benefit 2 | | $ | $ | $ | $ | $ | - | $ |
| Benefit 3 | | | | | | | - | |
| Other expense savings | | $ | $ | $ | $ | $ | - | $ |
| Total cost savings | | $ | $ | $ | $ | $ | - | $ |
| Total operating expenses | | | | | | | | |
| Year over year growth | | | | | | | | |

FIG. 7B

| (Enter Init Name Here) | | | | | | | Expense Pro Forma |
|---|---|---|---|---|---|---|---|
| | Driver/unit | 2001 | 2002 | 2003 | 2004 | 2005 | 2006 | Planning total |

Funding Reconciliation
This section reconciles the expense shown above to the actual funding requirements

| | 2001 | 2002 | 2003 | 2004 | 2005 | 2006 | Planning total |
|---|---|---|---|---|---|---|---|
| Total operating expenses | $ - | | | | | | |
| Less: | | | | | | | |
| Cost Savings | $ - | $ - | $ - | $ - | $ - | $ - | |
| Revenue Retention | $ - | $ - | $ - | $ - | $ - | $ - | |
| Funding from internal (functional area) budget | $ - | $ - | $ - | $ - | $ - | $ - | |
| Funding from internal (functional area) budget | $ - | $ - | $ - | $ - | $ - | $ - | |
| Funding from other COUs | $ - | $ - | $ - | $ - | $ - | $ - | |
| Funding from other SRUs | $ - | $ - | $ - | $ - | $ - | $ - | |
| Other sources of funding - list | $ - | $ - | $ - | $ - | $ - | $ - | |
| Other sources of funding - list | $ - | $ - | $ - | $ - | $ - | $ - | |
| Subtotal, other funding | $ - | $ - | $ - | $ - | $ - | $ - | |
| Total expense funding request | - | - | - | - | - | - | - |

FIG. 7C

| (Enter Init Name Here) | Expense Logic & Assumptions |
|---|---|

| # Expense Assumptions | Source: |
|---|---|
| 1 | |
| 2 | |
| 3 | |
| 4 | |
| 5 | |
| 6 | |
| 7 | |
| 8 | |
| 9 | |
| 10 | |

FIG. 8

Capital Pro Forma (Enter Init Name Here)

| | Number of Life years | Driver/unit | 2001 | 2002 | 2003 | 2004 | 2005 | 2006 | Planning total |
|---|---|---|---|---|---|---|---|---|---|
| Capital Deployed | | | | | | | | | |
| Capital Item | 3 | | $ | - | $ | $ | $ | $ | $ |
| Capital Item | 3 | | $ | - | $ | $ | $ | $ | $ |
| Capital Item | 3 | | $ | - | $ | $ | $ | $ | $ |
| Capital Item | 5 | | $ | - | $ | $ | $ | $ | $ |
| Capital Item | 7 | | $ | - | $ | $ | $ | $ | $ |
| Capital Item | 10 | | $ | - | $ | $ | $ | $ | $ |
| Capital Item | 10 | | $ | - | $ | $ | $ | $ | $ |
| Capital Item | 3 | | $ | - | $ | $ | $ | $ | $ |
| Capital Item | 5 | | $ | - | $ | $ | $ | $ | $ |
| Capital Item | 7 | | $ | - | $ | $ | $ | $ | $ |
| Total capital deployed | | | $ | - | $ | $ | $ | $ | $ |
| Depreciation expense / Year | | | | | | | | | |
| Total book depreciation expense | | | $ | - | $ | $ | $ | $ | $ |
| Net book value, end of year | | | | | | | | | |
| NBV, end of year | | | $ | - | $ | $ | $ | $ | $ |

FIG. 9A

| Funding Reconciliation | | | | | | |
|---|---|---|---|---|---|---|
| This section reconciles the capital shown above to the actual funding requirements | | | | | | |
| | 2001 | 2002 | 2003 | 2004 | 2005 | 2006 | Planning total |
| Total capital deployed | $ - | $ - | $ - | $ - | $ - | $ - | $ - |
| Less: | | | | | | | |
| Funding from internal (functional area) budget | $ - | $ - | $ - | $ - | $ - | $ - | $ - |
| Funding from internal (functional area) budget | $ - | $ - | $ - | $ - | $ - | $ - | $ - |
| Funding from other COUs | $ - | $ - | $ - | $ - | $ - | $ - | $ - |
| Other sources of funding - list | $ - | $ - | $ - | $ - | $ - | $ - | $ - |
| Other sources of funding - list | $ - | $ - | $ - | $ - | $ - | $ - | $ - |
| Subtotal, other funding | $ - | $ - | $ - | $ - | $ - | $ - | $ - |
| Total capital funding request | $ - | $ - | $ - | $ - | $ - | $ - | $ - |

*Impact Assessment*

| Known Associated Initiatives | Business Areas Involved | Obtained From | Impact on Current Initiative | Level of Impact |
|---|---|---|---|---|
| | | | | |
| | | | | |
| | | | | |
| | | | | |
| | | | | |
| | | | | |
| | | | | |

FIG. 11

"Initiative Name" Scorecard

▓ Progressing on Schedule with No Issues  ☐ Schedule/Issue Concerns  ■ Behind Schedule/Major Issue

FINANCIAL

| # | Description | Goal to be Achieved | 5% | 10% | 15% | 20% | 30% | 40% | 50% | 60% | 70% | 80% | 85% | 90% | 95% | 100% |
|---|---|---|---|---|---|---|---|---|---|---|---|---|---|---|---|---|
| | | | \multicolumn{14}{c}{Progress in Achieving Goal} |
| F1 | | | | | | | | | | | | | | | | |
| F2 | | | | | | | | | | | | | | | | |
| F3 | | | | | | | | | | | | | | | | |

INTERNAL PROCESSES

| # | Description | Goal to be Achieved | 5% | 10% | 15% | 20% | 30% | 40% | 50% | 60% | 70% | 80% | 85% | 90% | 95% | 100% |
|---|---|---|---|---|---|---|---|---|---|---|---|---|---|---|---|---|
| | | | \multicolumn{14}{c}{Progress in Achieving Goal} |
| I1 | | | | | | | | | | | | | | | | |
| I2 | | | | | | | | | | | | | | | | |
| I3 | | | | | | | | | | | | | | | | |

CUSTOMER

| # | Description | Goal to be Achieved | 5% | 10% | 15% | 20% | 30% | 40% | 50% | 60% | 70% | 80% | 85% | 90% | 95% | 100% |
|---|---|---|---|---|---|---|---|---|---|---|---|---|---|---|---|---|
| | | | \multicolumn{14}{c}{Progress in Achieving Goal} |
| C1 | | | | | | | | | | | | | | | | |
| C2 | | | | | | | | | | | | | | | | |
| C3 | | | | | | | | | | | | | | | | |

LEARNING AND GROWTH

| # | Description | Goal to be Achieved | 5% | 10% | 15% | 20% | 30% | 40% | 50% | 60% | 70% | 80% | 85% | 90% | 95% | 100% |
|---|---|---|---|---|---|---|---|---|---|---|---|---|---|---|---|---|
| | | | \multicolumn{14}{c}{Progress in Achieving Goal} |
| L1 | | | | | | | | | | | | | | | | |
| L2 | | | | | | | | | | | | | | | | |
| L3 | | | | | | | | | | | | | | | | |

| | 5% | 10% | 15% | 20% | 30% | 40% | 50% | 60% | 70% | 80% | 85% | 90% | 95% | 100% |
|---|---|---|---|---|---|---|---|---|---|---|---|---|---|---|
| *Initiative Completion* | | | | | | | | | | | | | | |
| *Percentage of Budget Utilized* | | | | | | | | | | | | | | |

FIG. 12A

| # | Description | Area of Concern/Issue | Action Plan to Address Concern/Issue |
|---|---|---|---|
| | | | |

"Initiative Name" Scorecard Areas of Concern/Issue Details

FIG. 12B

*Portfolio Scorecard Areas of Concern/Issue Details*

| # | Description | Area of Concern/Issue | Action Plan to Address Concern/Issue |
|---|---|---|---|
| | | | |
| | | | |
| | | | |

FIG. 13B

High Level Workplan

| Step # | Project Phase and Task | Accountable | Resources Involved/Coordination Points | Deliverables/Milestones | Begin Date | Complete Date |
|---|---|---|---|---|---|---|
| 1. | Initiation | | | | | |
| A. | | | | | | |
| B. | | | | | | |
| C. | | | | | | |
| 2. | Planning | | | | | |
| A. | | | | | | |
| B. | | | | | | |
| C. | | | | | | |
| D. | | | | | | |
| 3. | Design | | | | | |
| A. | | | | | | |
| B. | | | | | | |
| C. | | | | | | |

Sample Detailed Workplan

| | Task Name | Start | Finish |
|---|---|---|---|
| | Kick-off activities | Thu 3/25/99 | Wed 3/31/99 |
| 📅 | Confirm team members | Thu 3/25/99 | Thu 3/25/99 |
| 📅 | Establish milestones, schedule items, etc. | Thu 3/25/99 | Thu 3/25/99 |
| 📅 | Set-up collaborative workspace(s) | Thu 3/25/99 | Thu 3/25/99 |
| 📅 | Identify initial client stakeholder and objectives | Thu 3/25/99 | Thu 3/25/99 |
| | ABC Co team kickoff activities | Thu 3/25/99 | Fri 3/26/99 |
| 📅 | engagement and business objectives | Thu 3/25/99 | Fri 3/26/99 |
| 📅 | key deliverables definition and discussions (strawman deliverables; does/does no | Thu 3/25/99 | Fri 3/26/99 |
| 📅 | create detailed workplan and schedule | Thu 3/25/99 | Fri 3/26/99 |
| 📅 | roles, operating principles, scheduling issues | Thu 3/25/99 | Fri 3/26/99 |
| | Project (client/ABC Co) kick-off | Mon 3/29/99 | Wed 3/31/99 |
| 📅 | Initiate leading practices review | Mon 3/29/99 | Mon 3/29/99 |
| 📅 | Initiate web audit | Mon 3/29/99 | Mon 3/29/99 |
| 📅 | engagement and business objectives | Tue 3/30/99 | Wed 3/31/99 |
| 📅 | key deliverables discussions | Tue 3/30/99 | Wed 3/31/99 |
| 📅 | Update high-level reverse planning (from Xmas season and IPO milestones) | Tue 3/30/99 | Wed 3/31/99 |
| | Adjust Project Approach and Initiate Current State Assessment | Mon 3/1/99 | Mon 4/19/99 |
| 📅 | Adapt workshop designs and schedule working sessions | Thu 4/1/99 | Mon 4/5/99 |
| 📅 | Summarize initial executive input (produces initial vision, mission, goals, criteria, etc ) | Mon 4/5/99 | Thu 4/8/99 |
| | Initiate Current State Assessment | Mon 3/1/99 | Thu 4/8/99 |
| 📅 | Identify initial contacts for current state data and information | Mon 3/1/99 | Mon 3/1/99 |
| 📅 | Conduct initial walk-through and interviews | Thu 4/8/99 | Thu 4/8/99 |
| 📅 | Confirm approach for call center and e-business I/T Architecture assessment | Thu 4/8/99 | Thu 4/8/99 |
| | Develop "what we would do" strawman | Fri 4/9/99 | Mon 4/19/99 |
| 📅 | Create approach for fast-path strategy creation workshop | Fri 4/9/99 | Mon 4/12/99 |
| 📅 | Develop strawman 2002 vision and trajectory | Tue 4/13/99 | Tue 4/13/99 |

FIG. 15A

Sample Detailed Workplan (Continued)

| Task Name | Start | Finish |
|---|---|---|
| Review recent organizational changes | Mon 4/26/99 | Thu 4/29/99 |
| Develop deliverable on CRM/call center scan | Fri 4/30/99 | Fri 4/30/99 |
| Conduct technology assessment | Wed 4/21/99 | Fri 4/30/99 |
| Complete applications map | Wed 4/21/99 | Fri 4/30/99 |
| Define applications map and functions by core applications | Wed 4/21/99 | Fri 4/30/99 |
| Finalize recommended transition plan from System A | Wed 4/21/99 | Fri 4/30/99 |
| Define conceptual architecture | Wed 4/21/99 | Fri 4/30/99 |
| Develop preliminary list of I/T standards | Wed 4/21/99 | Fri 4/30/99 |
| Develop deliverable on I/T scan | Wed 4/21/99 | Fri 4/30/99 |
| Create strawman initiatives outline | Mon 5/3/99 | Thu 5/6/99 |
| Review current state, leading practices, "Must Haves" and "Killer App's" | Mon 5/3/99 | Tue 5/4/99 |
| Refine potential initiatives and select required/high-impacts | Tue 5/4/99 | Wed 5/5/99 |
| Characterize process, org., and I/T implications of selected initiatives | Wed 5/5/99 | Thu 5/6/99 |
| Develop financial cost analysis by opportunity | Thu 5/6/99 | Thu 5/6/99 |
| Estimate one-time, ongoing and capital costs by opportunity | Thu 5/6/99 | Thu 5/6/99 |
| Develop High-Level Implementation Plans for chosen initiatives | Thu 5/6/99 | Mon 5/10/99 |
| Validate and prioritize initiatives and high-level plans | Tue 5/11/99 | Tue 5/11/99 |
| Review, adjust and prioritize | Tue 5/11/99 | Tue 5/11/99 |
| Develop initial implementation plans | Tue 5/11/99 | Fri 5/14/99 |
| Identify initial next steps | Tue 5/11/99 | Fri 5/14/99 |
| Develop Governance Framework | Tue 5/11/99 | Fri 5/14/99 |
| Develop recommended organizational structure | Tue 5/11/99 | Fri 5/14/99 |
| Develop initial job descriptions | Tue 5/11/99 | Fri 5/14/99 |
| Develop evaluation metrics framework (high-level) | Tue 5/11/99 | Fri 5/14/99 |
| Refine high-level implementation plans | Tue 5/11/99 | Fri 5/14/99 |
| Validate Implementation plans (draft final document) | Tue 5/18/99 | Tue 5/18/99 |

FIG. 15B

Risk Assessment

The following risks have been identified for this initiative. These risks were prioritized, impacts identified, and mitigation strategies documented. Priority scale has been defined as follows:

Risk Impact Level
High – Impede Ability for Initiative to Succeed
Medium – Significant impact on the benefits that can be obtained
Low – Minimal impact - can work around

Potential for Risk to Occur
High – 80% and higher chance of occurring
Medium – 50%-79% chance of occurring
Low – Below 50% chance of occurring

| Risk | Category/ Type of Risk | Risk Impact Level | Potential for Risk to Occur | Mitigation Approach |
|---|---|---|---|---|
| Initiative Risks | | | | |
| | | Select One | Select One | |
| | | Select One | Select One | |
| | | Select One | Select One | |
| | | Select One | Select One | |
| | | Select One | Select One | |
| | | Select One | Select One | |
| | | Select One | Select One | |
| Portfolio Risks | | | | |
| | | Select One | Select One | |
| | | Select One | Select One | |
| | | Select One | Select One | |
| | | Select One | Select One | |
| | | Select One | Select One | |
| | | Select One | Select One | |

FIG. 16

Initiative Adjustment

| Change Number | Change Type | Change Reason | Estimated Effort (Time and Resources) | Budget Adjustment (+ or -) | Deliverable Changes | Requestor | Approval | Date Approved |
|---|---|---|---|---|---|---|---|---|
|  | Select One | Select One |  |  |  |  |  |  |
|  | Select One | Select One |  |  |  |  |  |  |
|  | Select One | Select One |  |  |  |  |  |  |
|  | Select One | Select One |  |  |  |  |  |  |
|  | Select One | Select One |  |  |  |  |  |  |
|  | Select One | Select One |  |  |  |  |  |  |
|  | Select One | Select One |  |  |  |  |  |  |
|  | Select One | Select One |  |  |  |  |  |  |
|  | Select One | Select One |  |  |  |  |  |  |
|  | Select One | Select One |  |  |  |  |  |  |
|  | Select One | Select One |  |  |  |  |  |  |
|  | Select One | Select One |  |  |  |  |  |  |
|  | Select One | Select One |  |  |  |  |  |  |
|  | Select One | Select One |  |  |  |  |  |  |
|  | Select One | Select One |  |  |  |  |  |  |
|  | Select One | Select One |  |  |  |  |  |  |
|  | Select One | Select One |  |  |  |  |  |  |
|  | Select One | Select One |  |  |  |  |  |  |
|  | Select One | Select One |  |  |  |  |  |  |
|  | Select One | Select One |  |  |  |  |  |  |

FIG. 17

Initiative Review

| |
|---|
| Initiative Title |
| Supported Customer Rule     - Please Select One - |
| Date Submitted |
| Project Start Date                               Project End Date |
| Project Manager |

Overall Initiative Performance

Did the Initiative meet the expected objectives?      ☐ Yes    ☐ No
*Details:*

Was the initial scope altered during the Execute and Manage stage?      ☐ Yes    ☐ No
*Details:*

Quantifiable Benefits (Taken from the Business Case)
To what degree where the following benefits obtained? Detail the Actual Results

| Benefit | Expected Result | Actual Result |
|---|---|---|
| | | |
| | | |
| | | |
| | | |
| | | |
| | | |

Intangible Benefits (Taken from the Business Case)

| Benefit | Expected Result | Actual Result |
|---|---|---|
| | | |
| | | |
| | | |
| | | |
| | | |
| | | |

What has been the overall impact of the initiative?
*Details:*

How has the outcome of the Initiative contributed to the Customer Rule?
*Details:*

FIG. 18A

Risks (Taken from the Risk Assessment)
Where the identified risks realized? How were they addressed? What were the outcomes?

| Did It Occur | Risk | Category/ Type of Risk | Actions Taken and Outcomes |
|---|---|---|---|
| | *Initiative Risks* | | |
| | | | • |
| | | | • |
| | | | • |
| | | | • |
| | | | • |
| | | | • |
| | | | • |
| | | | • |
| | *Portfolio Risks* | | |
| | | | • |
| | | | • |
| | | | • |
| | | | • |
| | | | • |
| | | | • |
| | | | • |

Financial Performance

Did the Initiative stay within the estimated budget?   ☐ Yes   ☐ No
*Details:*

Were expected increased revenues or decreased costs realized?   ☐ Yes   ☐ No
*Details:*

Schedule Performance

Was the initiative completed within the timeframe established in the Detailed Workplan?   ☐ Yes   ☐ No
*Details:*

Resource Performance

Where the correct resources secured for the initiative?   ☐ Yes   ☐ No
*Details:*

How well did the initiative team perform?
*Details:*

General

What templates or re-usable documents or methodologies were developed that can be shared with other initiative teams or the Initiative Portfolio Management? Please describe and provide copies of the templates or documents.
- 
- 
-

FIG. 18B

*Knowledge Incorporation*

---

From the initiative:
What went really well?

What should have been done differently?

What five lessons were learned from the initiative that can be incorporated into other initiatives? Please describe these lessons.

- 
- 
- 
- 
-

What resources outside of the initiative team were critical to the success of the initiative? How did they provide assistance/support?

What areas should have received greater sponsorship and backing from upper and executive management?

---

For the Portfolio

Of the Lessons Learned from the initiative, which can be incorporated into existing initiatives? Please Describe.

What suggested changes should be made to the Control Mechanisms or the Initiative Portfolio Management? Please Describe.

What has been the overall impact of the initiative on the portfolio of projects supporting the Customer Rule? Please Describe.

FIG. 19A

Communication

What communication regarding the success of the initiative has been done? Please Describe.

Was obtaining buy-in and support for the initiative difficult or quickly obtained? Please describe.

What has been the feedback regarding the effectiveness and success of the initiative on enhancing the Customer Rule? Please Describe.

What additional action steps need to be taken to communicate the results of the initiative to the greater business population?

| Action Step | Desired Outcome | Responsible | Date to be Completed |
|---|---|---|---|
| | | | |
| | | | |
| | | | |
| | | | |

Ongoing Tracking

What activities/outcomes associated with the initiative must be tracked on an ongoing basis to verify success of the initiative?

| Activity/Outcome to Track | Reason | How Measured | Responsible |
|---|---|---|---|
| | | | |
| | | | |
| | | | |

FIG. 19B

METHODS AND SYSTEMS FOR CHANGE INITIATIVE MANAGEMENT

BACKGROUND OF THE INVENTION

1. Field of the Invention

The present invention relates to business management. More particularly, the present invention relates to methods and systems for change initiative management.

2. Background Information

Improving customer service and maximizing profitability are typically critical objectives for companies. To meet these objectives, many companies such as most large companies, consulting organizations, any organizations in a fast changing environment have established program management offices to coordinate service improvement efforts. For example, a program management office can undertake a portfolio of initiatives to improve a company's ability to meet customer service and financial commitments. These initiatives can be complex undertakings with various costs and benefits. Execution of these initiatives can require plans that outline resource and timing constraints and expectations. Furthermore, these initiatives can entail risk that the end result of the initiative may be negative rather than positive. In view of the foregoing, it can be appreciated that a substantial need exists for methods and systems that can advantageously provide for change initiative management.

BRIEF SUMMARY OF THE INVENTION

The present invention is a system and method for initiative management that includes identifying and defining an initiative and developing a business case for the initiative. The business case includes an initiative scorecard. The system and method also includes generating an initiative plan, including an initiative risk assessment. The system and method furthermore includes managing execution of the initiative and evaluating execution and management of the initiative.

In an embodiment of the invention, the system and method of initiative management includes a plurality of initiative management stages, and each initiative management stage includes one or more control mechanisms. The system and method includes an identify and define stage and a business case stage associated with the identify and define initiative stage. The business case initiative stage includes an impact assessment control mechanism. The system and method also includes a plan initiative stage associated with the business case initiative stage, an execute and manage stage associated with the plan initiative stage, and a close and evaluate stage associated with the execute and mange stage.

In a further embodiment, a system for change initiative management includes a means for identifying and defining an initiative coupled to a means for generating an initiative business case. The system also includes a means for generating an initiative plan coupled to the means for generating an initiative business case. The means for generating an initiative plan includes an initiative risk assessment data record. Further, the system includes a means for managing execution of the initiative coupled to the means for generating the initiative plan, and a means for closing and evaluating the initiative coupled to the means for management execution of the initiative.

BRIEF DESCRIPTION OF THE DRAWINGS

FIGS. 2A, 2B and 2C illustrate an example of an initiative summary data record in accordance with an embodiment of the present invention.

FIGS. 3A, 3B and 3C illustrate an example of a business case data record in accordance with an embodiment of the present invention.

FIGS. 4A and 4B illustrate an example of an initiative financial summary data record in accordance with an embodiment of the present invention.

FIG. 5 illustrates an example of an initiative revenue pro forma data record in accordance with an embodiment of the present invention.

FIG. 6 illustrates an example of an initiative revenue logic and assumptions data record in accordance with an embodiment of the present invention.

FIGS. 7A, 7B and 7C illustrate an example of an initiative expense pro forma data record in accordance with an embodiment of the present invention.

FIG. 8 illustrates an example of an initiative expense logic and assumptions data record in accordance with an embodiment of the present invention.

FIGS. 9A and 9B illustrate an example of an initiative capital pro forma data record in accordance with an embodiment of the present invention.

FIG. 10 illustrates an example of an initiative capital logic and assumptions data record in accordance with an embodiment of the present invention.

FIG. 11 illustrates an example of an initiative impact assessment data record in accordance with an embodiment of the present invention.

FIGS. 12A and 12B illustrate an example of an initiative scorecard data record in accordance with an embodiment of the present invention.

FIGS. 13A and 13B illustrate an example of an initiative portfolio scorecard data record in accordance with an embodiment of the present invention.

FIGS. 14A and 14B illustrate an example of an initiative high level work plan data record in accordance with an embodiment of the present invention.

FIGS. 15A and 15B illustrate an example of an initiative sample detailed work plan data record in accordance with an embodiment of the present invention.

FIG. 16 illustrates an example of an initiative risk assessment data record in accordance with an embodiment of the present invention.

FIG. 17 illustrates an example of an initiative adjustment data record in accordance with an embodiment of the present invention.

FIGS. 18A and 18B illustrate an example of an initiative review data record in accordance with an embodiment of the present invention.

FIGS. 19A and 19B illustrate an example of an initiative knowledge incorporation data record in accordance with an embodiment of the present invention.

Figure 1:
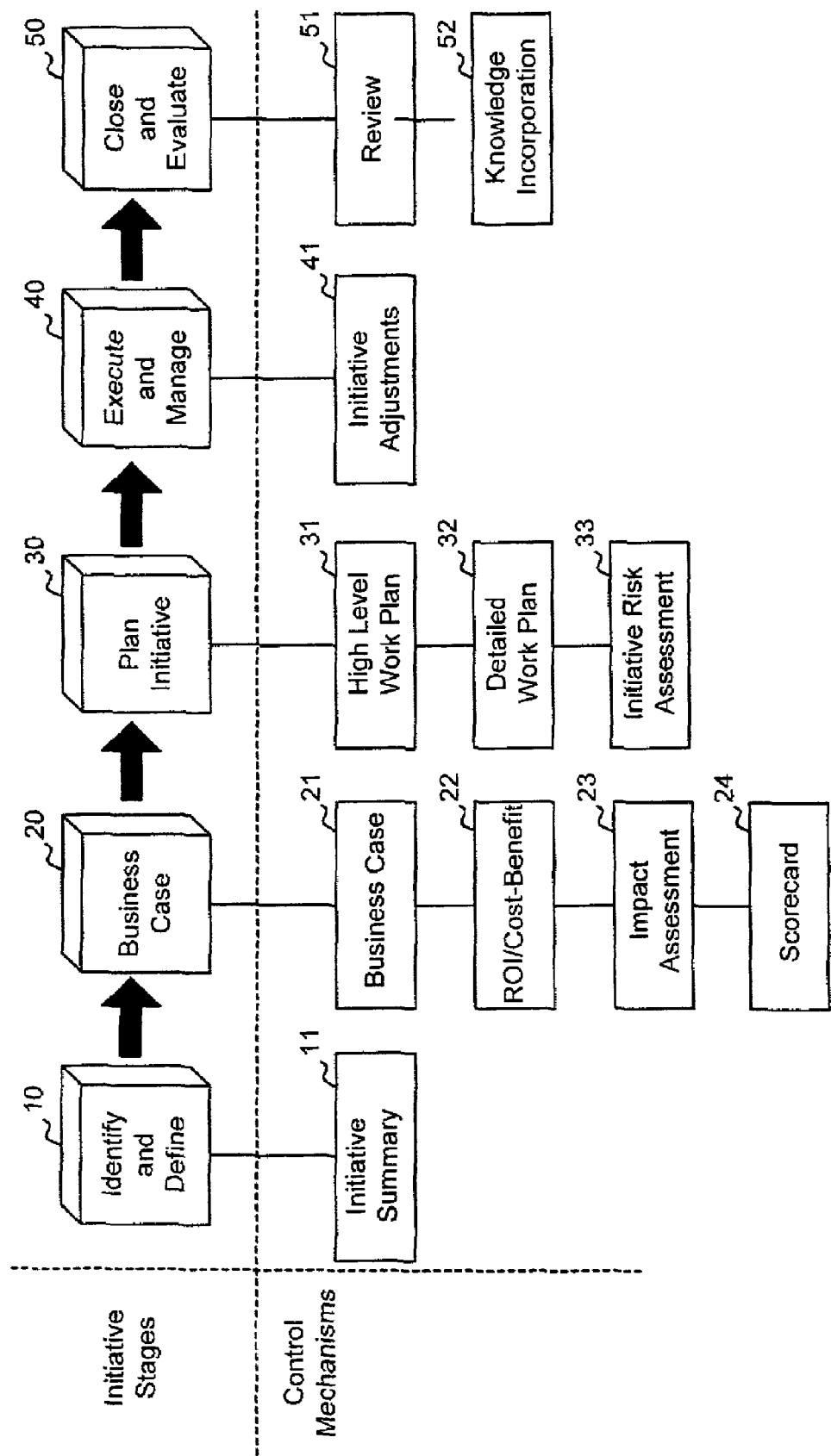
FIG. 1 is illustration of an embodiment of the present invention.

Before one or more embodiments of the invention are described in detail, one skilled in the art will appreciate that the invention is not limited in its application to the details of construction, the arrangements of components, and the arrangement of steps set forth in the following detailed description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

FIG. 1 is an illustration of an embodiment of the present invention. In a system or method for change initiative management in accordance with an embodiment of the present invention, a change initiative can be managed in a series of stages and each of the initiative stages can be associated with one or more control mechanisms. For example, a change initiative can be managed in a plurality of stages including an identify and define stage 10, a business case stage 20, a plan initiative stage 30, an execute and manage stage 40, and a close and evaluate stage 50. Identify and define stage 10 can be associated with an initiative summary control mechanism 11. Business case stage 20 can be associated with a business case control mechanism 21, a return on investment ("ROI")/cost-benefit control mechanism 22, an impact assessment control mechanism 23, and a scorecard of initiative defined metrics control mechanism 24. Plan initiative 30 can be associated with a high level work plan control mechanism 31, a detailed work plan control mechanism 32, and an initiative risk assessment control mechanism 33. Execute and manage stage 40 can be associated with an initiative adjustments control mechanism 41. Close and evaluate stage 50 can be associated with a review control mechanism 51 and a knowledge incorporation control mechanism 52.

These initiative stages and control mechanisms are further illustrated and described in FIGS. 2 through 19 and in the accompanying written descriptions. FIGS. 2 through 19 illustrate a variety of initiative data records. One of skill in the art will understand from this description of embodiments of the present invention that examples of data records include documents, documentation, database records, databases, word processing documents and data, spreadsheet documents and data, audio-video information, graphical information, textual information, and so on.

FIGS. 2A, 2B and 2C illustrate an example of an initiative summary data record in accordance with an embodiment of the present invention. A purpose of the initiative summary data record is to provide a high-level overview of the initiative being considered for inclusion under the service imperative. This data record is not intended to be as complete as a business case, but it can provide enough information to evaluate the benefits of the proposed initiative and to allow for planning of its execution within an initiative management entity ("initiative management"). For example, initiative management can be a manager, a collection of managers, or a program management office that manages an initiative portfolio.

The initiative summary data record establishes a "place holder" within the portfolio while a project team responsible for managing the initiative is gathering additional support documentation and completing the business case. It serves as a communication data record to other parts of the organization as team members, impacts, costs and benefits are being identified.

The initiative summary data record (i.e., initiative summary) is the first formal data record submitted to initiative management. It is completed during the identify and define stage 10 and is part of the initiative summary control mechanism 11. The following sections of information can be included in the initiative summary data record.

Initiative title. This is the name that is assigned to the initiative. It may change as the initiative is further developed, but an initial name is required for tracking and communication purposes.

Supported customer rule. A customer rule is a guideline that a company optionally can use to determine if activities meet customer expectations. Each initiative should link directly to a specific customer rule. It may be found that an initiative links to multiple customer rules. If this is the case, the customer rule standing to benefit most from the initiative should be selected.

Date submitted. This is the date the initiative summary data record is presented to initiative management.

Business case due date. This is the proposed due date of the business case. This date may change due to information collected. The purpose of the date is to provide insight on when data to support the initiative may be collected, and a date of when the project may actually start to be implemented.

Project start date. Timing for the execution of the initiative may not be fully determined at the time of data record submission, but an estimate of the start and ending times should be provided. This is for planning purposes so the initiative management can identify any conflicts with other initiatives. This identifies the anticipated start date for the initiative, and is typically the same as the business case date of when the project will start!

Project end date. Identifies the anticipated end date of the initiative.

Main contact person. Identifies the main contact person for the initiative development activities. This person may not be the final project manager, but he/she is the person responsible for ensuring the business case is developed and the project team is identified.

Additional contact. Identifies other contacts associated with the initiative in case the main contact is unavailable.

Initiative description. Provides a brief description of the initiative including the scope, and objectives.

Major milestones. This section identifies the major milestones associated with the initiative. These milestones do not need to be tied to specific dates at this time, but should be detailed enough to provide a clear view of critical items.

Organizations involved and required supporters. Initiatives identified to support a service imperative can require support from many different organizations across a company. It can be critical to identify these organizations early enough in the process to gather the support required to implement cross-functional initiatives. This section identifies the known organizations associated with, influenced by, or required by the initiative. Along with the organizations involved, the cross-functional initiatives may not survive without strong, visible support from upper management. This section also identifies those required supporters that should be aware of the initiative, and those supporters who can actively supportive of the initiative. Tasks associated with the support activities can be built into the communications plan as the initiative progresses.

Background and current situation. This section describes how the initiative came to be and what led to the development of the initiative. For those initiatives that may require a change in the way work is currently done, an overview of the current situation should be provided. If the goal of the initiative is not being addressed at the current time, then the focus should be on why the initiative is important—what gaps exist that the initiative may address.

Benefits. Identifies what benefits the initiative may provide. These benefits can be in the form of increased customer satisfaction, cost reduction, revenue enhancement, productivity gain, etc. Both tangible and intangible benefits should be described in as much detail as possible. These benefits will be detailed further in the business case.

High level areas of impact. Each initiative can impact and be impacted by activities within the organization. It can be critical to identify the degree of impact the initiative may have on the business operations as they exist in order to prepare for the change activities that may be required to foster the initiative. It can also be critical to understand what activities, processes, and Company Organizations or Units ("COUs") that exist in the current environment may impact the success of the initiative. If it is found that the degree of impact in either direction is too great, then a risk mitigation strategy can be defined during the development of the business case.

Another area of great concern is the impact on the customer. Any impact on the way in which the customer does business with or receives benefit from the company should be identified as early in the process as possible. These impacts can includes such things as cycle time, productivity, quality, timing, etc.

Potential required resources. At this stage, some initiatives may have project teams associated with them. If the initiative has been defined to this level, then this section should be completed with the names of the team members and the areas/skill sets they may provide. If the team members are not identified, then the section should include the skill sets and or knowledge required by each of the team members. Identification of this information may allow for the correct team members to be identified and retained.

Estimated cost to implement. Though all the costs associated with the initiative may not be known at this stage, it can be critical to optionally identify a high level figure for planning and evaluation purposes. This number does not need to be exact but should take into consideration the overall implementation.

Barriers to success. It can be critical to optionally identify early those things that may become barriers to the success of the initiative. If they can be identified early in the process, then a mitigation strategy can be developed to eliminate the barrier, or steps can be built into the plan to address them before they impact the initiative.

Barriers can include such things as a lack of technology required for the initiative, change management issues that can be overcome, failed initiatives in the past that have weakened the spirit of the team, etc.

Action plan. Since this is the first data record submitted highlighting the initiative, it is expected that a great deal of information may need to be collected to further develop the initiative. This section of the data record should outline the steps that may be taken to collect and identify the needed information. Each step may have an assigned owner and a time deadline for completion.

This section includes such things as: (i) steps required to identify required resources; (ii) steps required to identify additional impacts of the initiative on the business; (iii) steps required to identify additional impacts of business activities on the initiative; and (iv) steps required to identify costs associated with the initiative.

Each activity highlighted may be assigned to an owner responsible for completing it, and target dates for its completion. If there are dependencies such as any other plan or initiative which must be completed before this initiative can be successful, then they should be called out in the action plan to ensure the initiative team is aware of what can be completed and when. Along with an owner and dates, each activity can have a specific outcome identified. This outcome can be a deliverable, a result, a completed communication message, etc.

This action plan is typically not a work plan for the initiative, but an action plan to finish developing the initiative and moving it through to completion of the business case.

Next steps. After the initiative summary data record is completed, the development of the business case begins. The information provided in the initiative summary data record serves as the initial input into the business case. Some of this information may be changed as additional data is collected and evaluated.

FIGS. 3A, 3B and 3C illustrate an example of a business case data record in accordance with an embodiment of the present invention. The business case data record (i.e., business case) is part of the business case control mechanism 21 and typically must be completed in order for the initiative to move forward. This mechanism contains critical information required to make "go forward" decisions regarding the initiative. The purpose of the data record is to provide detailed information about the initiative and to establish baseline measurements for tracking purposes.

Accurate measurements may not be available, or may be too difficult to collect. If so, the business case should contain experienced-based estimates from reliable sources (sources typically can be identified for follow-up), task-based estimates if numbers exist, estimates from a quick evaluation that can be performed between two set periods of time, or utilizing historical data.

The business case data record is submitted after the initiative summary data record and prior to the project kick-off. It is completed during the business case stage 20. Other data records such as the ROI/cost-benefit data record and the impact assessment may also be submitted along with the business case. The following sections of information can be included in the business case data record.

Initiative title. This is the formalized name of the initiative. It may have changed from the initiative summary data record. This name may become the formal name for communication. The business case supporting the initiative may be assigned a number when it is submitted to the initiative management.

Supported business strategy or goal. An initiative can relate to a business strategy or business goal rule (e.g., a customer service objective). For such an initiative, the associated customer service objective can be selected from a drop down list.

Date submitted. This is the date the business case is submitted to the initiative management.

Project start date. Identifies the date the project is scheduled to begin. This is for planning purposes within the initiative management, as well as for communication to the organization.

Project end date. Identifies the date the project is scheduled to be completed.

Project manager, phone, ipage (e.g., e-mail). It is expected that by the time the business case is developed and finalized, a project manager may be selected. This is the person assigned to manage the project through to completion. Contact details typically can be provided for the project manager.

Additional contact, phone, ipage. Provides contact information for a person on the team other than the project manager. This person serves as a back-up in case the project manager is unavailable. This person typically can be very informed on the business case and be able to answer questions that may arise.

Team member. Identifies each of the team members slated or targeted to be on the project team for the initiative. These members may not all be full time, the goal is to identify who they are and which skills they provide. Some members may serve as subject matter experts and only be involved on an as needed basis. These members should be included in the list.

Role/responsibility. Identifies the role the team member may play on the project and his/her responsibility. This section should include whether the team member is full-time or part-time.

Organizational area/COU. Identifies the area(s) the team member represents as well as his/her area of specialty.

Purpose of initiative. Provides options to be selected to highlight the purpose of the initiative. The options include, for example, revenue growth, increased productivity, increased customer satisfaction, decreased cost, process efficiency, employee satisfaction, or another purpose or purposes. If more than one option is met by the initiative, the option with the greatest impact should be selected. Additional comments can be captured within the body of the business case.

Impact on customer. Provides options to be selected to highlight the impact the initiative may have on the way the company does business with the customer. The options include, for example, changes how the customer does business with the company, impacts how the customer operates, minimal impact on external customer (i.e., a consumer, a separate company, an unrelated company, etc.), no impact on customer, significant impact on external customers, and so on. If more than one option is met by the initiative, the option with the greatest impact should be selected. Additional comments can be captured within the body of the business case.

Impact on business. Provides options to be selected to highlight the impact the initiative may have on the business units and functions within the company. Most initiatives may affect more than one area and require input from multiple organizations. The options to be selected include, for example:
 minimal—affects only 1 or 2 COUs
 moderate—affects several employees
 significant—affects many functional areas and businesses There should only be one selection associated with the initiative. Additional comments can be captured within the body of the business case.

Risk assessment. Provides options to be selected to highlight the amount of risk associated with the success of the initiative. Any risks identified contributing to the potential failure of the project should be addressed through mitigation strategies in the initiative risk assessment. The options to be selected include, for example:
 minimal—90-100% confident of initiative success
 moderate—70-89% confident of initiative success
 substantial—20-69% confident of initiative success
 high—less than 20% confident of initiative success Potential risks may be more fully addressed in the initiative risk assessment, with high level comments included in the business case. The initiative risk assessment can be submitted along with the business case.

Competitive impact. Provides options to be selected to highlight the competitive impact of the initiative. Not all initiatives will provide a great deal of competitive advantage, though those that do should be identified for future communication purposes. The options to be selected include:
 does not provide competitive advantage
 matches competitive capability
 provides for competitive advantage The degree of competitive advantage does not need to be identified in this section, but can be discussed in the details of the business case.

Is funding secured? Some initiatives may be submitted with full financial support already secured, others may require assistance in obtaining funding. If the initiative already has funding it should be identified in this section. Specifics of the funding should be identified in the details of the business case.

Details of the business case. The business case is supported by the ROI/cost-benefit analysis, which provides the financial information to support the initiative. These data records should be submitted together to provide a strong overview regarding the need to implement the initiative.

The sections to be completed in the business case build upon many of the selections made from the drop down lists in the first part of the business case, along with additional details to support the initiative. These sections include:
 executive summary
 current situation
 business objectives
 recommended solution
 quantifiable benefits
 intangible benefits
 assumptions, impacts, and risks
 budget and costs Each section is described in greater detail below.

Executive summary. The executive summary highlights the key points of each of the sections detailed below. This section should not exceed one page in length. It should begin with the problem statement taken from the current situation section, and be supported by the business objectives to address the problem statement. The recommended solution may highlight how the problem statement may be addressed, and how the business objectives may be obtained.

In support of the recommended solution, the major benefits should be highlighted, as well as the major costs required to implement it. The major risks associated with implementing the initiative should be called out in order to give a full understanding of potential difficulties that may arise during implementation.

Along with the overview of the need and recommended solution, the executive summary should point out the measurement of success. This may provide input to the initiative scorecard as well as serve as a communication vehicle for the initiative.

Current situation. This section describes how the issue that the initiative may address is being resolved today. This description should take into consideration those things that are going well, and those things that need to be changed. Details of the impact of the current situation on business and financial performance should be identified. The current situation should also encompass an explanation of the need for the initiative along with an overview of how it would change the current state.

If the issues described in the current situation section have been addressed before, then an explanation of these activities and their outcomes should be provided. This information may most likely also play into the risk assessment to be completed during the plan initiative stage 30. This information is extremely important in understanding what has and what has not worked in the past in order to avoid any major pitfalls and to plan for potential difficulties.

Business objectives. From the drop down boxes above, the purpose of the initiative was selected. This purpose should be directly in line with the business objectives surrounding the initiative. This section details the business objectives. Supporting information including how the business objectives may be measured should be provided—specific measurement information may also be captured on the initiative scorecard.

Recommended solution. This section details the recommended solution that may be implemented. This is one of the most important sections of the business case because it describes the solution including the scope and the approach the initiative may take. Supporting this are the high level tasks that can be completed and the major milestones that may be realized throughout the life of the initiative.

At this point there is no need to go deeply into the activities and tasks that may be completed during the implementation of the initiative. This information may be captured in detail during the plan initiative stage 30.

Quantifiable benefits. One of the easiest ways to communicate the benefits of an initiative is to focus on the quantifiable benefits that may result from its implementation. Quantifiable benefits are usually focused around financial gains (revenue, profitability), cycle time reduction, productivity increase, cost reduction, etc. In this section the quantifiable benefits should be identified and detailed along with how they may be measured and tracked.

Some benefits are realized immediately, others may take a longer time and may only be realized after the initiative has been implemented and executed for a period of time. The goal is to place some timeframe around the realization of benefits from the initiative.

The table in the business case template requires three fields to be completed: (i) benefit, (ii) rationale, and (ii) quantified result.

(i). Benefit. Describes the type of benefit that may be received (e.g., increased cross-sell/up-sell opportunities between products).

(ii). Rationale. Describes how the quantifiable benefit may be calculated (e.g., the change may allow the agents to spend 10% less time capturing useless information from customers and increase sales activities by 8%).

(iii). Quantified result. Describes the actual quantified result (e.g., may lead to an increase of sales of x product of $xxx.). The benefits identified in the business case may be included on the initiative scorecard for tracking purposes.

Intangible benefits. Intangible benefits are not necessarily hard to identify, but they are often hard to measure or to baseline. Though quantifiable benefits are often more visible, the intangible benefits frequently have the biggest impact on the business. Intangible benefits can include such things as increased morale, increased satisfaction, enhanced culture, value added services, etc. Impact on customer service and the delivery of service is often captured within the intangible benefits. Any impact on customer service should be detailed in this section.

It is important to identify the intangible benefits associated with the initiative along with the ways they may be achieved. If there are associated measurements already in place to measure them, these measurements should be detailed. If measurements need to be developed to measure them, then proposed measurements are to be detailed here. If parameters can be placed around the intangible benefits, then they may become part of the initiative scorecard. For example, the following parameters can be considered:

(i) Benefit. Describes the type of benefit that may be received (e.g., increased employee satisfaction);

(ii) Rationale. Describes how the benefit may be determined (e.g., greater access to corporate information, greater access to training and skills development activities); and (iii) Result. Describes the actual quantified result (e.g., happier employees and increased productivity).

Assumptions. In developing the business case many assumptions may be made. These assumptions can be documented in full with the source of the information identified. The assumptions may serve as the basis for all recommendations and calculations. If the assumptions made are found to be incorrect, then the information derived from them can be updated to reflect the correct information. Assumptions can be documented as follows:

(i) Assumption: Documents information that is assumed but not fully known. This information can be related to inputs to and outputs from the initiative, as well as the implementation of the initiative; and (ii) Source: Identifies the source of the assumption, or the source of the information used to develop the assumption.

Impacts. Impacts may be evaluated in great detail in the impact assessment. If there is enough information for the impact assessment to be completed at this time, then it can be added to this section of the business case. But, given that the initiative may touch many parts of the business and potentially impact multiple groups that are not immediately identified, a high level assessment can be included in the business case. The sections to be completed are:

(i) Impact: Documents immediately known impacts the initiative may have on the business, or that other projects may have on the initiative. Details of the type and severity of the impact should be provided; and (ii) Source: Identifies the source of the impact information Risks. Risks may be evaluated and addressed through mitigation strategies at a much deeper level in the risk assessment. If there is enough information for the risk assessment to be completed it can be added to this section of the business case. Many of the risks associated with the initiative may not be identified until the plan initiative stage 30. Therefore the detailed risk assessment may be completed then. If no detailed assessment is completed, then all known risks should be documented in the business case. The information should include:

(i) Risk. Identifies risks directly associated with the success of the initiative. These risks can include management support, knowledge and expertise of resources, budget constraints, availability of resources, as well as many other risks. This section should include any risk to the success of the initiative associated with other initiatives underway, planned, or that have failed in the past. The outcomes of initiative that have been tried before (both successful and non-successful) should be provided. For those initiatives that have been tried before and failed, an explanation of the reason for failure should be provided.

(ii) Mitigation strategy. For each risk identified detail a mitigation strategy that may help manage the occurrence of the risk. This should include contingency steps to be taken in case the risk becomes a reality.

Budget and costs. The budget and costs associated with the initiative can be identified and evaluated to ensure the feasibility of the initiative. This section may be supported by the ROI/cost-benefit calculations which may focus on the financial impact of the initiative. As a quick review of the financial requirements a few questions can be answered. They are detailed below.

What are the major cost components of the initiative? In understanding the financial impact of the initiative, it is critical to identify the areas that may require funding. This description should be detailed based on human resource costs, organizational costs, technology costs, capital costs, and any other cost component that is significant.

How is the initiative being funded? Initiatives may be funded from multiple areas. Some will be funded within a specific COU, some across COUs, some under the service imperative program office, as well as many other locations. It is important to understand where the funding in coming from as quickly as possible in order to facilitate the execution of the initiative. Another important factor in the funding process is to look for opportunities to incorporate initiatives as extensions of existing projects. This may decrease the need for additional funding and generally increase acceptance of the initiative across the organization. A third form of funding the initiative is to look for projects that are in existence that should be replaced by the new initiative. This would free up the money dedicated to an existing project for the initiative. This can be done if the new initiative will be a greater improvement over the current project, or if the current project is no longer valid. This type of funding may require a larger amount of buy-in and approval.

Provide a funding schedule. Most initiatives may not require all the funding to be released at the same time. If the estimated timing of financial resources is known, then it should be detailed in this section.

A purpose of the return on investment/cost-benefit analysis control mechanism 22 of the business case initiative stage 20 is to provide financial justification for the initiative. It identifies the requirements for monetary resources and highlights the tangible and opportunity costs associated with execution of the initiative.

For those initiatives with clear return on investment details, it may highlight the projected return and identify a breakeven point for the initiative. It is possible that only high level return and cost/benefit information is available until further along in the planning process. As this information is identified, it can be evaluated and included.

The return on investment/cost-benefit analysis is submitted in conjunction with or just following the business case. It can be submitted for the initiative to be accepted into the initiative management. It is completed during the business case stage 20.

The ROI/cost-benefit data record takes into consideration the total costs required to fund the initiative (hard dollars, cost of resources, equipment, and work activities as well as the benefits to be received over time). It evaluates the period of time before the results may be recognized. This is much easier done for those initiatives with hard dollar amounts available than for initiatives with mainly intangible benefits.

In defining the financial impact of the initiative, the activities are broken down into multiple steps each focused on a specific component of the financial analysis. These components include:

financial summary
financial graphics
revenue pro forma
revenue assumptions
expense pro forma
expense assumptions
expense funding reconciliation
capital pro forma
capital assumptions
capital funding reconciliation Each of these data records, examples of which are illustrated in FIGS. 4 through 10, requires specific information that can be gathered from multiple resources during, for example, the business case stage 20. Organizations that may be involved in providing data include finance, human resources, COU operations, marketing, technology, as well as many other areas.

Figure 4B:
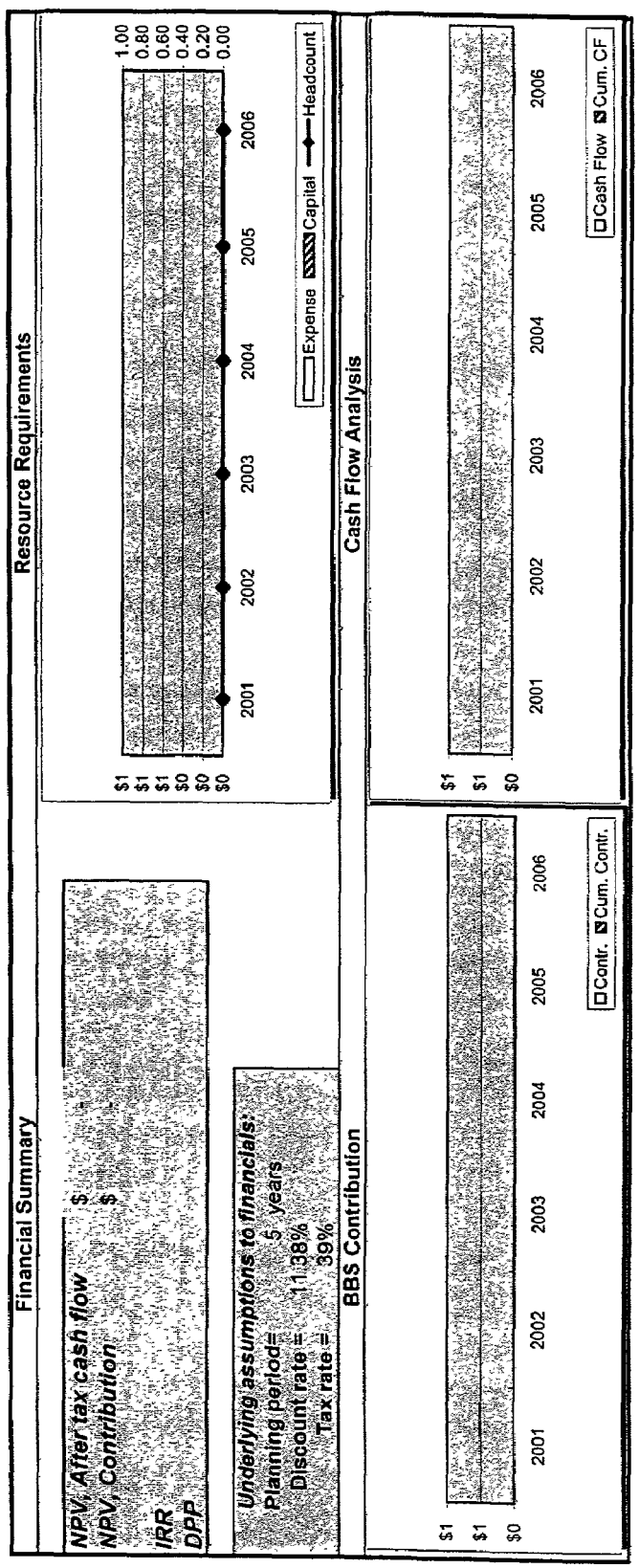

FIGS. 4a and 4b illustrate an example of an initiative financial summary data record in accordance with an embodiment of the present invention. The financial summary can combine all information collected on the other sheets and aggregates it to provide an overview of the financial needs and expectations of the initiative. Information on this sheet includes: (i) revenue; (ii) expenses; (iii) contribution; and (iv) resource requirements. The high level categories are calculated on each of the subsequent sheets. In an embodiment, the information on the financial summary is directly populated from the other sheets and requires no manual input. This sheet is protected and should not be changed. Details of how information is calculated are located on the spreadsheet. The summary graphics data records display the financial information in graphical form. Depending on the type of information available, these documents may not always be the same. Typical graphical displays include: (i) financial summary information; (ii) resource requirements; (iii) required contribution—equals the total operating revenue (TOR)—total operating expenses (TOE); and (iv) ROI graph—identifies the point at which the total revenue or benefit generated exceeds the total cost/expense of the initiative. This ends the payback period for the investment made to implement the initiative.

FIG. 5 illustrates an example of an initiative revenue pro forma data record in accordance with an embodiment of the present invention. The revenue pro forma is the location where all revenue information is captured. New revenue is calculated in two basic steps and is generally derived from the expected number of customers and unit pricing (recurring and non-recurring).

1. Recurring: recurring revenue takes into account the monthly charges collected from customers. It is based on the recurring unit price.

2. Non-recurring: non-recurring revenue is based on such items as the price for installation or set-up, one time product and service sales, periodic fees and other non-recurring revenues.

In most cases new initiatives are going to be essentially replacements or alternatives for existing products and services or enhancements to existing processes. This means that not all initiative revenues may be incremental. Therefore, in order to only count revenue dollars once, an adjustment can be made for cannibalized revenues.

Another section of the revenue pro forma focuses on retention revenue. Some initiatives may focus on retaining revenue that otherwise would be lost from the company. This revenue should be accounted for in this section. This requires understanding what percentage of revenue is expected to be lost, as well as what percentage the initiative can assist in retaining. All assumptions around these numbers should be captured in the revenue assumptions.

Since many initiatives may focus on process improvements and changes it may not be immediately clear how associated revenue should accounted for. This is another area where assumptions should be made to truly detail how the associations have been made. By understanding the prospected new revenue, the impact of cannibalized revenue, and the anticipated retained revenue, a true understanding of the revenue impact of the initiative can be estimated. Additional details of the calculations will be apparent to one of skill in the art based upon the disclosure herein.

FIG. 6 illustrates an example of an initiative revenue logic and assumptions data record in accordance with an embodiment of the present invention. The revenue logic and assumptions data record can include all assumptions made regarding the information used to calculate the revenue figures in the revenue pro forma. This would include, but is not limited to, such items as retention revenue, market size, target segments, pricing rationale, discounting plans, etc.

Each piece of information obtained should be documented to show from where it was received (e.g., interest rate at 8%, received from finance department) and what assumptions were made about the information.

Some information may not be easily identified and may require estimation as part of the calculation. For this type of information, it is critical to document from where the estimated information was obtained in order to understand the validity of the information.

The idea behind this construct is to allow easy review for impacted business segments to provide their support. This part of the planning template is critical in determining the true benefits that may lead to "hard" dollars. The information captured should focus on "most likely" scenarios when information can be estimated. It should be as specific and as quantified as possible. Although space has been provided for up to ten assumptions, more can be added as necessary.

FIGS. 7A, 7B and 7C illustrate an example of an initiative expense pro forma data record in accordance with an embodiment of the present invention. The expense pro forma data record captures the direct expenses associated with revenue recognized on the revenue pro forma. This allows for proper matching of revenue and expense dollars. Transfer pricing may capture most of the cost of goods sold expenses. On the expense pro forma template there are four major areas outlined where expenses can be calculated. These are not exhaustive of the potential areas associated with the initiative. As additional areas (e.g., such as expenses for a specific initiative) are identified, additional sections can be added to the sheet.

The first section focuses on the cost of goods sold. These are all expenses related to the selling of products and services. This section includes both one time costs and recurring costs. Revenue cannibalized refers to the costs associated with the revenue cannibalized and need to be subtracted to match incremental expenses with incremental revenues. In cases with retained revenue—expense associated with those retained revenues would also need to be included in the cost of goods sold section.

Employee-related costs should reflect needs across the company (e.g., not in a specific functional area only) and should generally be based on the pay grade for which the incremental headcount may be added. Fully loaded rates for different pay grades can be obtained from functional area financial managers, or from the company's finance department.

All other expenses include those expenses that do not fall into a larger category, but need to be captured in the expense pro forma. These can include one-time awards, kick-off expenses, professional services, communications, as well as many other expenses.

Occasionally, new products or processes allow the organization to capture a cost savings. All cost savings can be included on the expense pro forma and can be detailed. Cost savings should be almost certain and easily identifiable in order to be reflected. If either or both of these descriptions do not fit, cost savings projections should not be included in the model. This information is entered into the spreadsheet as a (−) negative number and is subtracted from the total expenses from the other categories. By subtracting the cost savings from the expenses identified, the total operating expenses can be determined.

The funding reconciliation data record portion illustrated in FIG. 7C enables management to easily understand other sources of funding and consider that as part of their assessment of how to proceed. A similar funding reconciliation data record is included as part of the capital pro forma data record illustrated in FIG. 9B.

FIG. 8 illustrates an example of an initiative expense logic and assumptions data record in accordance with an embodiment of the present invention. This data records can include all assumptions made regarding the information used to calculate the expense figures in the expense pro forma. This would include, but is not limited to, such items as network/developmental costs, additional headcount requirements, overtime, training, communications costs, etc.

Each piece of information obtained should be documented to show from where it was received (e.g., fully loaded headcount=$xxx, received from HR department) and what assumptions were made about the information (e.g., these costs are expected to increase by 3.5% over the next year and a half).

The expense pro forma also takes into consideration cost savings that can be gained through improved efficiency or effectiveness. Any speculations made around this type of cost savings can be detailed in the assumptions here.

Some information may not be easily identified and may require estimation as part of the calculation. For this type of information, it is critical to document from where the estimated information was obtained in order to understand the validity of the information. It is a good idea to incorporate subject matter experts and relevant stakeholders along the way while developing these assumptions. These contacts should be listed in the "source" area of this sheet for each assumption.

The idea behind this construct is to allow easy review for impacted business segments to provide their support. This part of the planning template is critical in determining the true expenses that may lead to 'hard' costs. The information captured should focus on "most likely' scenarios when information can be estimated. Be as specific and quantification focused as possible. Although space has been provided for 10 assumptions, more can be added as necessary.

FIGS. 9A and 9B illustrate an example of an initiative capital pro forma data record in accordance with an embodiment of the present invention. The capital pro forma data record is used to capture the required investment in plant and equipment needed to implement the initiative. Capital investments (assets) are depreciated over time to match the expense of equipment with its useful life. Within the capital pro forma, identification of the value at which the company capitalizes assets can be made. If the business case requires assets under this amount (for example, most desktop PCs), these expenditures should be listed under the expense pro-forma instead of here.

Depreciation is calculated separately by the model based on the useful life of the asset that is displayed in column d for a number of typical asset classes. Sample items are provided on the spreadsheet. If other items are required, a 3, 5, or 7 year useful life should be used, depending on the asset (otherwise depreciation calculations may be incorrect). For specific questions on depreciation contact the finance department.

NBV refers to net book value and is the current value of the asset. NBV is calculated by subtracting cumulative depreciation from the original value. Over the useful life of an asset, NBV will decline to zero as depreciation is recognized.

As with the other pro forma sheets, if required, use formulas tying the necessary capital to the workings of the model for sensitivity analysis. For example, if you need a $3000 PC for every customer as part of the project's service offering, use $3000 as a driver/unit and a formula linking back to the number of units on the revenue pro forma page to calculate the total capital required for pcs.

Figure 10:
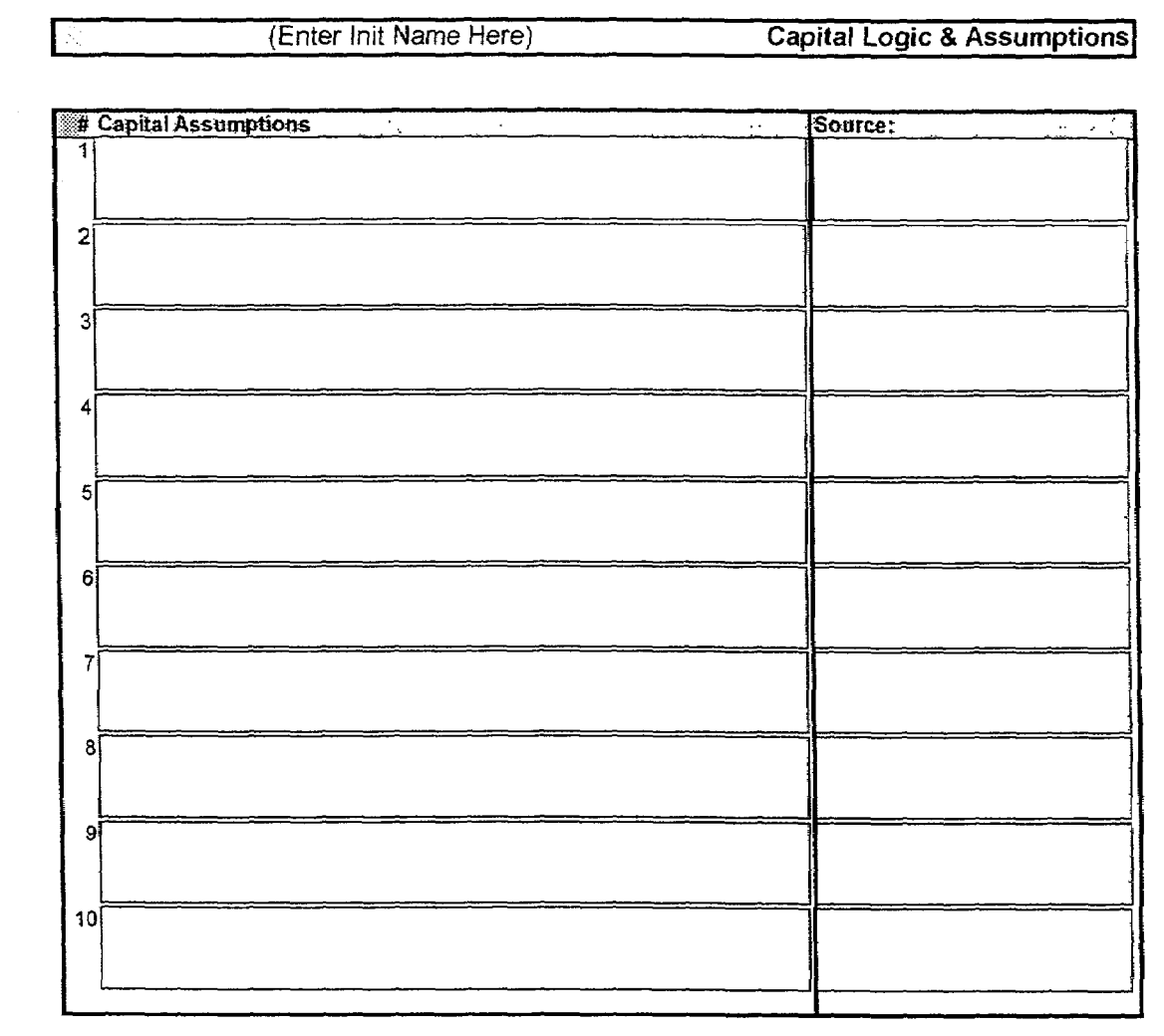

FIG. 10 illustrates an example of an initiative capital logic and assumptions data record in accordance with an embodiment of the present invention. The capital logic and assumptions data record can include all assumptions made regarding capital expenditure figures that may be used in the capital pro forma. Assumptions should take into consideration the capital items that may need to be purchased or funded as well as their depreciation rate based on the type of asset. This information can be captured in the assumptions and accounted for in the capital pro forma.

In identifying and documenting the capital assumptions it is critical to involve multiple parts of the business. This may help insure that the capital items needed for the initiative do not already exist, or that they can be shared among multiple groups, therefore lowering the cost that needs to be funded. The assumptions made should be as specific as possible and truly quantify the capital expense fully.

FIG. 11 illustrates an example of an initiative impact assessment data record in accordance with an embodiment of the present invention. The impact assessment data record is part of the impact assessment control mechanism 23 of business case stage 20. The purpose of the impact assessment is to fully identify all impacts the initiative may have on the existing business and other initiatives underway, as well as identify all impacts the existing business activities may have on the initiative. Truly understanding the impacts may assist the project team in communicating critical data and information to the appropriate people/organizations and planning the initiative in order to lessen any negative impacts and increase any positive impacts.

Identification of impacts may contribute to the decision of whether or not the initiative should move forward. If it is found that the negative impacts are too great, the initiative management may wish to suspend the initiative until a future period when the overall impact to the business is less, or to cancel the initiative all together. Conversely, if it is found that an initiative may very positively affect the business, it may be moved up in the funding and implementation schedule in order for the organization to take quicker advantage of the positive impacts of the initiative.

The impact assessment is developed during the business case stage 20. It can be submitted along with the business case data record or separately. As stated earlier in the business case stage 20 description, some impacts can be included in the business case data record, but the full impact assessment can be completed at a later date when all information is collected and compiled. This data record may be initiated in the business case stage 20 and completed in the plan initiative stage 30. It also can be completed prior to the execute and manage stage 40.

Known Associated Initiatives: Describes all known initiatives that exist that may impact or be impacted by the current initiative. This includes initiatives across the COUs and the business functional areas.

Business Areas Involved: Identifies all business areas and COUs involved in the known initiatives. This may allow for a communication process to be established to ensure that the initiative does not negatively impact existing projects and that open communication may lead to shared information and knowledge among initiatives.

Obtained From: Identifies the person who provided the information on the known initiative. This person becomes the contact point for any additional communication or questions.

Impact: Describes the actual impact of existing projects on the initiative or the impact of the initiative on the existing projects. This impact can be a positive one and enhance the initiative, or a negative one and impact the initiative. If the impact is negative, then a risk should be documented in the risk assessment and a mitigation strategy should be developed.

Level of Impact: This describes the level of impact the known projects may have on the initiative or the impact the initiative may have on known projects. This level of impact is directly related to the impact described in the previous column. The impact can be negative or positive. The impact degrees should be indicated as follows:

LP—Low Positive Impact
HP—High Positive Impact
LN—Low Negative Impact
HN—High Negative Impact One impact code should be assigned to each known initiative.

FIGS. 12A and 12B illustrate an example of an initiative scorecard data record in accordance with an embodiment of the present invention. The purpose of the initiative scorecard data record (i.e., initiative scorecard) is to define metrics that can be tracked to evaluate how well the initiative is performing against its own goals, as well as how well it is performing within the entire portfolio of projects supporting the service imperative. Each initiative may have direct impact on the success of the portfolio and therefore should be measured throughout its implementation cycle.

Each of the customer rules has specific criteria associated with it specifying how its success may be measured. These criteria should be considered when developing the measurements for the initiative. The scorecard metrics may begin to be defined during the business case stage 20 and this definition development may continue through the plan initiative stage 30. All metrics can be defined and baselined prior to the initiative kick-off. Throughout the execute and manage stage 40 the scorecard may be utilized to ensure the initiative is progressing as expected and producing the outcomes outlined in the business case data record. During this stage the scorecard may also be aggregated with other initiative scorecards to ensure the entire portfolio is progressing in support of the service imperative. During the close and evaluate stage 50 the scorecard may serve as an input to the initiative review control mechanism 51.

The initiative scorecard may be evaluated according to a standard reporting schedule. For initiatives spanning 6 months or longer, a monthly report of the initiative scorecard may be required, for projects less than 6 months in length, the initiative scorecard may be reported twice a month. Two levels of measurement are associated with the initiative scorecard: (1) measurements relating exclusively to the initiative; and (2) measurements relating to the portfolio.

Along with the initiative scorecard measurements, the initiative may be tracked and monitored by the initiative management office for project execution according to the work plan. The metrics utilized for the initiative scorecard may be specific to the initiative and its stated goals. A more detailed view of the two levels in included hereinafter.

Individual initiative scorecard measurements are directly associated with the initiative and have been outlined in the business objectives and benefits sections in the business case. As additional metrics and measurements are identified throughout the plan initiative stage 30, they should be baselined and added to the scorecard. The ability to provide baselined measurements may not be available for some initiatives, but every attempt should be made by the project team to establish a baseline. This may mean talking with specialists or subject matter experts, setting up timed trials to focus on specific activities or processes, estimating revenue enhancements and cost reductions, and setting goals for communication and building awareness across the organization about the initiative.

For those measurements that do not have hard data associated with them, it is critical to identify where the speculative information was obtained. This may help ensure the most notable resources were utilized to determine the baseline. Individual initiative measurements may be evaluated based on the accomplishment of specific activities and outcomes, as well as the progression being made in reaching the goal. In other words, some measurements may be accomplished and recorded, while others may be monitored and evaluated throughout the lifecycle of the initiative.

Measurements included in the initiative scorecard may be classified in 4 categories:
  Financial—includes sales, shareholder value, increased revenue, decreased costs, etc.
  Internal Processes—includes cycle time, productivity efficiency, on-time arrival, first time completions, etc.
  Customer—includes customer satisfaction, customer retention, number of new customers, etc.
  Learning and Growth—includes employee satisfaction, employee retention, culture enhancement, etc.

Since the measurements are specific to the initiative, each initiative scorecard may be different. For each of the individual initiative metrics the following can be detailed:
  Category—identified which of the four categories under which the metric falls (Financial, Internal Processes, Customer, Learning and Growth)
  Description—short description or title of metric
  Goal to be Achieved—describes the desired outcome of the initiative
  Progress in Achieving Goal—demonstrates the progress of the initiative in achieving its goal. The progress of the initiative is indicated by shading the boxes with "green", "yellow" or "red", depending on how far along the initiative is in achieving the goal, and how well it is progressing in achieving the goal. If the initiative is progressing with no issues, then the boxes should be filled with "green"; if there is some concern and the initiative team is working the issue then the box should be filled with "yellow"; and if there is serious concern about the success of the initiative in achieving the goal and intervention is required, then the box should be "red".
  Areas of Concern/Issues for each "yellow" or "red" indicator, a description of the reason the initiative is not making progress as expected can be detailed.
    #—Corresponds to the number on the Initiative Scorecard
    Description—Short title or description of metric
    Area of Concern/Issue—Describes the reason the initiative is not progressing as expected in a specific area. This corresponds to all "yellow" and "red" indicators
    Action Plan to Address Concern/Issue—for each area of concern/issue an action plan should be identified to get the initiative back on track
  Overall Percentage of Initiative Completion
  Percentage of Budget Utilized—the amount of funding used to date.

Figure 13A:

FIGS. 13A and 13B illustrate an example of an initiative portfolio scorecard data record in accordance with an embodiment of the present invention. The portfolio scorecard data record (i.e., portfolio scorecard) measurements are directly associated with the portfolio. The portfolio scorecard may encompass all initiatives within the portfolio. This view may provide insight into how well the goals and objectives of the service imperative are being supported and addressed by the initiatives. It can be critical to track this progress to ensure the portfolio is continuously improved. This template is completed and managed by initiative management.

Figure 14B:
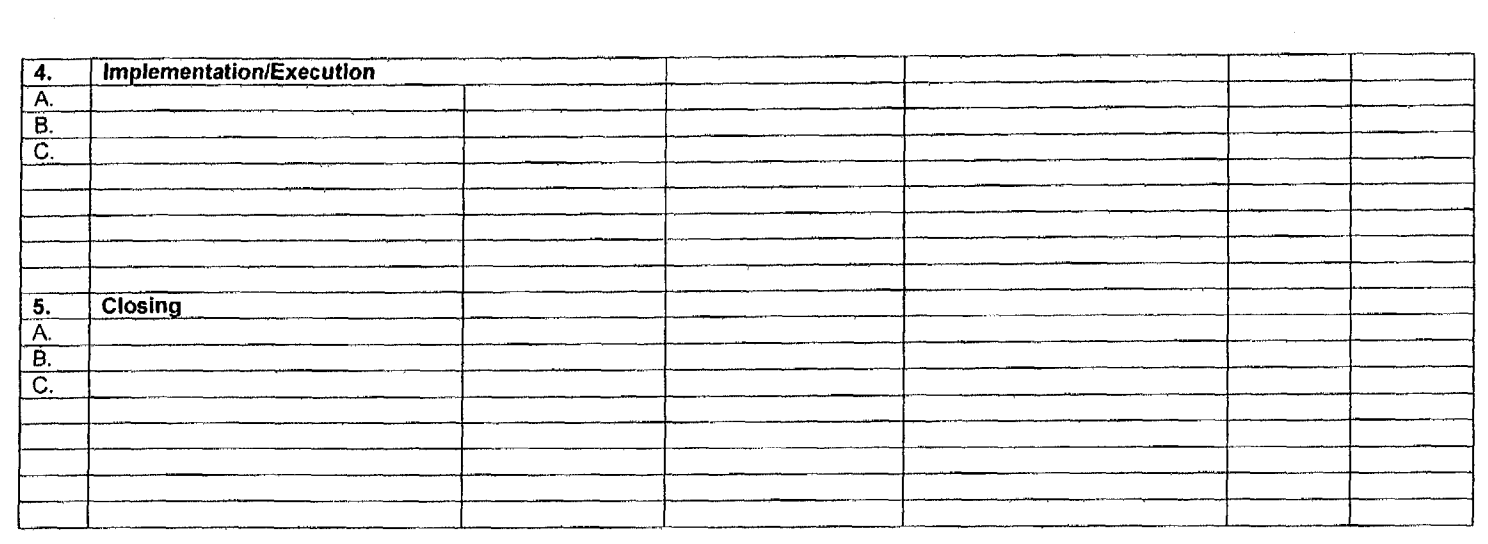

The categories associated with the portfolio scorecard are the same as for the initiatives but they relate to the overall portfolio as opposed to a single initiative. This may provide for easier tracking and association of the scorecard metrics. The fields to be completed include:
  Goal to be Achieved—Describes the desired outcome of the associated initiative
  Progress in Achieving Goal—demonstrates the progress of the initiatives associated with the portfolio. The progress of each initiative is indicated by shading the boxes "green", "yellow" or "red", depending on how far along the initiative is in achieving the goal as it relates to the portfolio, and how well it is progressing in achieving the goal. If the initiative is progressing with no issues, then the boxes should be filled with "green", if there is some concern and the initiative team is working the issue then the box should be filled with "yellow", and if there is serious concern about the success of the initiative in achieving the goal and intervention is required, then the box should be "red".
  Areas of Concern/Issues—For each "yellow" or "red" indicator, a description of the reason the initiative is not making progress as expected should be detailed. This section should include the impact the initiative's performance has on the overall portfolio supporting the service imperative. This section should be completed as follows:
    #—Corresponds to the number on the Initiative Scorecard
    Description—Short title or description of the initiative
    Area of Concern/Issue—Describes the reason the initiative is not progressing as expected in a specific area. This corresponds to all "yellow" and "red" indicators
    Action Plan to Address Concern/Issue—for each area of concern/issue, an action plan should be identified to get the initiative back on track FIGS. 14A and 14B illustrate an example of an initiative high level work plan data record in accordance with an embodiment of the present invention. The high level work plan data record (i.e., high level work plan) is the first step at putting structure around the initiative. It shows the high level sequence of work to be completed. This data record does not need to go into the sub-task level or activity level. The high level work plan is used as the planning tool to secure resources and set expectations regarding implementation of the initiative. It may also serve as the outline for the detailed work plan. The high level work plan is developed during the plan initiative stage 30. It can be completed prior to the detailed work plan, and the kick-off of the initiative.

Within the implementation process, there are five stages the initiative can go through: (1) initiation—resources are gathered, scope is validated, objectives are confirmed, high level work plan is developed; (2) planning—detailed work plan is developed, work is assigned resources are finalized; (3) design—incorporates current state assessments and future state designing along with implementation designing activities; (4) implementation/execution—includes the execution of the design or planned initiative activities: and (5) closing—focuses on the initiative wrap-up and review.

The high level work plan consists of seven specific categories that can be completed. They are detailed below.

Step #: each line item within the high level work plan can be individually numbered. The number scheme can be determined by the project manager, but should be kept simple, sequential and be representative of the phases or groupings of activities associated with the initiative (e.g., 1.a, 1.b, 1.c.1, 1.c.2, 1.d or 1, 1.1, 1.1.1, 2, 2.1, 2.2, 2.3.1).

Project phase and task: defines the phase of the initiative and the associated high level tasks. The high level tasks are defined sufficiently for the high level work plan; subtasks and activities may be included in the detailed work plan. Samples of high level tasks include:
document current state repair process
identify associated sub-processes
assess processes for areas of improvement
conduct cultural assessment
develop job descriptions for new processes
gather system requirements Accountable: identifies the person/people responsible for doing or managing the task.

Resources involved/coordination points: identifies the resources required to execute the task, as well as others in the company that need to be involved with providing information or assisting with the task. One of the major functions of this category is that it provides a look at how utilized resources may be, and where additional resources may be required.

Deliverables/milestones: identifies the deliverables and milestones associated with each task. Not all tasks may have deliverables or milestones directly associated, but they may contribute to a deliverable or milestone. The deliverable or milestone should only be recorded next to the task from which it is a direct result.

Begin date: identifies the date the task should begin.

End date: identifies the date the task should be completed.

FIGS. 15A and 15B illustrate an example of an initiative sample detailed work plan data record in accordance with an embodiment of the present invention. The detailed work plan data record (i.e., detailed work plan) provides a scheduling and tracking tool for all initiative work activities in order to easily understand what comes next and what progress has been made. It serves as a communication tool for initiative information, allows for the delegation of tasks and activities, and provides for easy reporting of initiative details including work and deliverables completed, milestones achieved and overall budget impacts. The detailed work plan allows the project manager to optimize initiative resources and establish realistic time frames for completing work activities.

The detailed work plan is completed by the project manager and the initiative team, for example, during the plan initiative stage 30. The high level work plan serves as the outline for the development of the detailed work plan. The detailed work plan is utilized throughout the execute and manage stage 40 and serves as an input to the initiative review control mechanism 51.

In an embodiment, the tool to be utilized by the initiative teams in developing the detailed work plan is Microsoft Project from Microsoft Corporation of Redmond, Wash. The tool provides a complete tutorial and roadmap for completing the detailed work plan. The template illustrated in FIGS. 15A and 15B is a sample detailed work plan intended to provide insight to the level of detail that can be provided.

There are multiple fields available to be completed within Microsoft Project, but not all fields may be required for every project. The degree to which the detailed work plan is completed may depend upon the length and complexity of the initiative. The information provided in the high level work plan can be directly incorporated into the detailed work plan.

Regardless of the length and complexity of the project, the following types of information can be required.

Task name: work may be identified at the task level, which is the highest level of executable steps. Each task may be further detailed through sub-tasks or activities that when executed may yield a milestone or deliverable. The high level "chunks" of work should have been identified in the high level work plan and can be further detailed for the detailed work plan. Each task can have a start and stop date and have a specific deliverable, milestone or outcome associated with it.

Specific resources: each resource can be identified by name. Within the detailed work plan the time commitment of each resource may be documented. This includes those resources assigned to the initiative full-time as well as part-time, or on an as needed basis. The cost of these resources may also be included in the work plan. This may allow a true overview of the costs to be identified.

After each task and activity has been identified, and the resources and their time commitments have been identified, resources can be matched to the tasks. Each task can have one or more resources assigned to it.

Cost: along with resources, each task may have a set cost associated with its execution. This may be determined by the budget entered and the amount of resources and capital assets associated with each task. Costs may include recurring costs and one-time costs associated with a specific task. Costs can be tracked in multiple ways through MS Project including at the task, milestone, resource and project levels.

The detailed work plan serves many purposes for the project manager and the initiative team including:
allowing for tracking resources and resource details easily;
providing the ability to shift and adapt the plan to accommodate changes with a clear understanding of impact;
the ability to have full understanding of the actual budget for executing the initiative;
understanding schedule conflicts before they become a reality;
allowing for specific notes and information to be captured about tasks and resources; and
displaying the project for communication in graphical form.

FIG. 16 illustrates an example of an initiative risk assessment data record in accordance with an embodiment of the present invention. The purpose of the risk assessment data record (i.e., risk assessment) is to describe factors internal or external to the initiative or business that may affect the success of the initiative. Once the risks are identified strategies are created to manage the risks in order to minimize any impact on the initiative. Each risk may be evaluated for its potential to become a reality as well as its degree of impact on the initiative in the case that it does.

Within the portfolio it is critical to evaluate the risk of the initiative on the individual level as well as part of the overall portfolio of initiatives related to customer service (e.g., a customer rule).

The risk assessment is completed in the plan initiative stage 30 and utilized throughout the execute and manage stage 40. If the risks are well enough known, the risk assessment can be completed during the business case stage 20. The risk assessment may be completed in a spreadsheet format. The following sections of the risk assessment can be defined and developed.

Risk: This section highlights the risks associated with the initiative. Direct initiative risks can be related to:
Timing
Resources
Skill levels and knowledge
Technology
Processes
Organization
Business impact
Financial Risks associated with the overall portfolio of initiatives supporting customer service directives (e.g., a customer rule) might include:
Timing of benefits to be realized
Potential success rate of overall portfolio
Impact of portfolio on achieving the customer rule
Total cost of portfolio
Impact of initiatives on each other
Availability of required resources across initiatives
Each risk can be described in detail.

Category: Identifies the category in which the risk is associated. The risks can be classified in multiple ways. Some categories include:
Business Impact
Financial
Timing
Resources
Technology As well as any others identified above, and others not mentioned.

Risk Impact Level: Each potential risk may have a different level of impact on the initiative if it becomes a reality. Each risk should be defined as having a low, medium or high impact on the initiative. The risk impact level should be determined by the project manager. Levels are defined as follows:
High—Impede ability for initiative to succeed
Medium—Significant impact on the benefits that can be obtained
Low—Minimal impact—can work around Potential for Risk to Occur: Along with the level of impact each risk may have on the initiative, it is critical to determine the probability of the risk occurring. In this section each risk is assigned a low, medium or high potential of occurring. Levels are defined as follows:
High—80% and higher chance of occurring
Medium—50%-79% chance of occurring
Low—Below 50% chance of occurring Mitigation Approach: This section describes the steps that may be taken to monitor, manage and mitigate the risk. It is important to have mitigation activities identified in case the risk materializes. The intent of monitoring the potential risk is to head off any negative impact before it happens.

FIG. 17 illustrates an example of an initiative adjustment data record in accordance with an embodiment of the present invention. The initiative adjustment data record (i.e., initiative adjustment) can facilitate and track changes and adjustments to the initiative that result from unforeseen circumstances such as changes in priorities, business focus, competitive pressures, as well as any other potential impacts. The initiative adjustment data record is part of the initiative adjustments control mechanism 41 should not serve as the issue log for the initiative, but should only focus on those changes or adjustments that alter the detailed work plan, budget, and/or resources.

Initiative adjustments occur during the execute and manage stage 40. Any adjustments made may be reviewed for lessons learned and impacts during the initiative review 51 and the knowledge incorporation 52 stages. Throughout the initiative lifecycle, it is expected that adjustments may be required at some point in the execution. These changes can be captured and accounted for in the detailed work plan and other initiative activities. Those adjustments that require additional support can be elevated to the initiative management level as quickly as possible in order to minimize off any negative effects. These change needs may be related to a multitude of needs/issues/requirements, including:
Additional initiatives added to the portfolio
May require some of the same resources
May identify ways of completing activities more quickly or more effectively
May compete for financial resources already committed
May be higher in priority or provide greater benefits
Shifts in business priorities
The overall business leads to a change in a process, product or service delivery
Priorities change within the organization
Resource needs shift
Resources committed to the initiative are needed back in their "real" jobs
Resources with the required skill sets are not available to assist with the project when needed
Original estimates are found to be incorrect
Time to implement the initiative was underestimated
Financial resources required to implement were underestimated
Resources required to implement were underestimated
Risks planned for/not planned for arise:
Risks that were potentials arise, mitigation strategies can be executed
Risks that were not planned for arise and require quick adjustments
Competitive pressures change the requirements of the initiative
Initiative can offer more competitive advantage if changed
What was thought to provide competitive advantage via the initiative is no longer valid A majority of these changes may be handled at the initiative level with support from the PMO. For those initiatives that require greater support to ensure the adjustments are made (e.g., require cross COU buy-in at the executive level, require assistance from key individuals in the company, or are in conflict with other key initiatives), a steering committee may be requested to assist. This should be the last resort.

In order for major adjustments to be made to the initiative, a formal change control process may be followed—this may be managed by the PMO. The initiative may be tracked on a constant basis via status reports throughout its execute and manage stage 40. The goal is to verify that adjustments required may be made as quickly, and early, as possible as not to disrupt the progress of the initiative.

Along with adjustments being made at the initiative level, it is critical to evaluate the individual initiative as it relates to the overall portfolio of initiatives that support a customer rule in order to identify any adjustments that need to be made within the portfolio. It may come to pass that an initiative that has been underway for a significant period of time may be superceded by a newer initiative, which could result in a shift in resources, timelines or communication.

It is critical that any changes and adjustments made to the initiative be recorded in the detailed work plan. Using Microsoft Project, the project manager can determine what type of impact the change/adjustment may have on the implementation schedule of the initiative, and therefore prepare the team to manage the impact. If the change/adjustment creates a new risk, or mitigates an already identified risk, then the risk assessment should be updated.

The following fields can be completed when logging a change or adjustment to the initiative.

- Change Number. Assigns a unique number to each change/adjustment. This number may identify the change and be associated with the impact the change may have on the detailed work plan.
- Change Type: Describes the type of change that may be required. The change/adjustment impact may lead to one of three change types:
  - Expand Existing Activity—the change/adjustment may expand a currently scheduled activity either by time, resources, budget or scope.
  - New Activity—the change/adjustment may require a new activity be added to the detailed work plan.
  - Delete Activity—the change/adjustment may lead to the deletion of an activity that was scheduled to take place.
- Change Reason: Describes the reason for the change. Specific business needs may lead to changes in the detailed work plan and should be identified for initiative review and evaluation purposes. Change reasons can include:
  - Contingency Change—This change may occur when an impact or risk is realized and a contingency plan is set in motion. If risks and impacts are identified early in the process and mitigated throughout the implementation, then the need for contingency changes may potentially be eliminated.
  - Competitive Change—As the initiative progresses, there may be changes to the competitive environment that would lead to a need for changes to the initiative.
  - Business Shift—Changes in business needs can necessitate a change in the implementation of the initiative. These changes can have significant impact on the initiative.
  - Budget Change—As priorities shift funding can be moved from one initiative to another. The increase or decrease in funds can have direct impact on the activities required to execute the initiative.
  - Resource Shift—Skilled resources can be defined early in the planning process. It may be determined that additional resources are required, or fewer resources are required which may have an impact on the activities that can be accomplished.
  - Scope Change—As the initiative progresses it may be found that additional parts of the business, products, processes, organizations, etc. should be included in the implementation. This would necessitate a change in scope of the detailed work plan and the addition of new activities to the work plan.
- Estimated Effort (Time and Resources): Describes the change/adjustment that needs to take place within the initiative. This section should include the activities that can change, the actual change that needs to occur, the impact on timing and resources as well as the expected result of the change. As much information as needed should be included in this section to ensure that a clear understanding of the initiative is provided.
- Budget Adjustment: Depending on the type of change/adjustment the budget required may increase or decrease. The positive or negative impact on the financial requirements can be detailed. If the change/adjustment is approved (which may be indicated in the approval column) then the change in funding requirements may be approved.
- Deliverable Changes: Some changes in activities may lead to changes in deliverables. All changes can be detailed and tracked through the detailed work plan.
- Requestor: Identifies the person responsible for making the change/adjustment request.
- Approval: Identifies the person(s) responsible for approving the change. This can include the initiative management, or for more critical changes it can include the steering committee. The change/adjustment can be approved before it can become part of the detailed work plan.
- Date Approved: Identifies the date the change/adjustment was approved. This date can be documented in order to track the effects and impacts of the changes against the baseline measurements (including budget, resources needs, benefits and costs).

FIGS. 18A and 18B illustrate an example of an initiative review data record in accordance with an embodiment of the present invention. The initiative review data record (i.e., initiative review) can be populated during the final review of the performance of the initiative once the detailed work plan activities have been completed. During this review an understanding of how well the initiative performed against its baselined estimates, goals and objectives may be determined. This mechanism also provides insight into how well the initiative was planned during the first few stages of the process.

The initiative review may be completed during the close and evaluate stage 50. It is expected that the initiative may be reviewed against its original estimates on an on-going basis throughout the execute and manage stage 40 and any major discrepancies may be addressed at that time.

From the original business case and other assessment documents, as well as through other information that is captured throughout the initiative lifecycle, data specific to the initiative's performance including financial return and cost figures should be captured. This may provide information on how effective the initiative has been in reaching its goals, how well the initiative contributed to a customer rule, and may highlight areas that need to be re-evaluated for future initiatives.

This information may play directly into the overall management of initiatives. If it is noticed that initiatives are consistently off from their original estimates then it is clear that better planning must be used. Return on investment measurement may not be able to be completed as soon as the project has ended, but should take place soon after the solution is in place. As this information becomes available, it should be added to the Initiative Review document. This data record should be completed by the initiative team. The sections and questions to be completed are described below.

Overall Initiative Performance

This section draws directly from data baselined early in the initiative development process, as well as data collected throughout the execute and manage stage 40.

Did the initiative meet the expected objectives? If all objectives were reached as outlined in the business case then the "Yes" box should be checked. If some or none of the objectives were reached then the "No" box should be checked. Details supporting either answer should be provided in the Details section.

Was the initial scope altered during the execute and manage stage 40? In order to get a clear understanding of how well the initiative was planned in the beginning and what impacts affected the focus of the initiative, it is important to understand any scope shifts during the execution of the initiative. Any changes should be discussed in detail. These changes should also have been recorded in the initiative adjustments and the detailed work plan.

Quantifiable Benefits: This section reviews the benefits that were outlined in the business case to ensure that they were achieved as planned. If the actual result is different from the expected result then details of the differences can be provided. This should be completed for both tangible benefits, which are more easily measured, as well as intangible benefits. For those initiatives that do not expect to realize the benefits until a later time, this information should be recorded in the actual result column.

What has been the overall impact of the initiative? In the impact assessment the impact the initiative was expected to have on the business was identified and detailed. In this section the actual impact of the initiative should be detailed. This may include additional initiatives or activities that resulted from the work performed, changes in business processes and procedures, new roles and responsibilities, changes to other initiatives, as well as many other outcomes.

How has the outcome of the initiative contributed to a customer rule? Each initiative can be directly linked to a customer rule in the beginning of the planning process. Therefore, the success of the initiative may have a direct effect on the enhancement of the customer rule. The section should detail how the outcome of the initiative supports the customer rule.

Risks: In the initiative risk assessment risks were identified and mitigation strategies were developed. This section takes a closer look at the identified risks and evaluates whether or not they occurred, and if they did how they were addressed and what the results were. If actions taken were different from the those planned in the mitigation strategies, detail the reasons.

Financial Performance

Did the initiative stay within the estimated budget? In assessing the initiative it is important to know if the initiative stayed with the budget that was established for it in the business case. If the activities, priorities, scope, objectives or any other part of the initiative changed throughout its implementation, then most likely there was some impact to the budget. Details should be provided regarding any changes that were made that impacted the budget.

Were expected increased revenues or decreased costs realized? Not all initiatives may focus on increasing revenues or decreasing costs, but for those that do it is critical to understand if these goals were met. Details of the increases or decreases should be provided.

Schedule Performance

Was the initiative completed within the timeframe established in the detailed work plan? During the development of the detailed work plan a confirmation of the initiative timeframe was completed. This provided dates to track the progress of the initiative against, as well as set expectations of when the benefits could be realized. This section identifies whether or not the initiative actually was successfully completed within the identified timeframe. Details should be provided for any discrepancy from plan.

Resource Performance

Where the correct resources secured for the initiatives? During the project summary document and the business case skills and knowledge required to execute the initiative are determined and resources with the correct skills and knowledge are identified and secured. This section reviews the resources involved and assesses them for lessons learned in staffing.

How well did the initiative team perform? This section focuses on how well the initiative team worked together as a team. Since the initiatives span multiple functions and COUs it is predicted that team members may come from multiple organizations across the company. In order for the team to work together effectively some team building activities may be required. Details of the team's effectiveness should be provided.

General

What templates or re-usable documents or methodology were developed that can be shared with other initiative teams or the initiative management? In order to enhance the performance of future initiatives it is important to benefit from the work that has been completed. One way to do this is to re-use documents and methodology that is developed. In this section detail any templates, re-usable documents or methodology that was utilized or developed during the initiative execution.

FIGS. 19A and 19B illustrate an example of an initiative knowledge incorporation data record in accordance with an embodiment of the present invention. The knowledge incorporation mechanism 52 reviews the initiative from an overall effectiveness perspective and gathers lessons learned that can be incorporated into the overall initiative control framework, the initiative management and as lessons learned for other initiatives. Another aspect of the knowledge incorporation mechanism 52 is how well the success of the initiative is communicated across the company. In order to continue developing enthusiasm to support service imperatives, employees need to see that the efforts being put into the initiatives are leading to success.

The knowledge incorporation mechanism is initiated along with the initiative review in the close and evaluate stage 50. The information collected is utilized far past the completion of the initiative. The key to this mechanism is the identification and capture of information and lessons learned that may provide benefit to other initiatives. This data record can be completed by the project manager along with a representative of the initiative management in order to ensure relevant information is captured and evaluated in conjunction with other initiatives. This may insure a transfer of knowledge from the initiative team to the initiative management.

From the Initiative

What went really well? This section describes what went exceptionally well during the initiative execution. It should focus on activities from planning to closing.

What should have been done differently? This section describes those things that should have been done differently. The situation, the actions taken, the outcome and how the situation could have been handled differently should be detailed.

What lessons were learned from the initiative that can be incorporated into other initiatives? In order to truly capitalize upon the information that was gained by the initiative team, it is important to identify lessons that can be shared with other initiative teams. In this section, at least five lessons learned should be detailed. These lessons can include such things as:

Contact list of resources with specific skill sets

Activities that increase team effectiveness and when to utilize them

Pitfalls that were identified along the way and ways to address them

Suggestions on planning or securing funding

As well as many other categories

What resources outside of the initiative team were critical to the success of the initiative? How did they provide assistance/support? Given that the initiatives are cross-functional and may require knowledge and skill sets from multiple places throughout the company, the initiative team may rely heavily on resources outside of the team to assist with communicating and executing the initiative. These additional key resources should be documented along with how they provided additional support. This information may not only assist other initiatives, but it also ensure that the resources identified are recognized for their support.

What areas should have received greater sponsorship and backing from upper and executive management? Cross-functional or cross-COU initiatives require a significant amount of support in order for them to be successful. This section describes areas that could have used greater support from the management team or other parts of the organization. This information can be used to ensure the results of the initiative continue by alerting the initiative management of the support required. The sponsorship of the initiative should continue well after the implementation is complete.

For the Portfolio

Of the lessons learned from the initiative, which can be incorporated into existing initiatives? The goal of identifying lessons learned is to improve the performance of future initiatives and to plan for potential downfalls in order to avoid them. The initiative management can be cognizant of when lessons learned from one initiative can immediately benefit another. Each review of lessons learned should be followed by a review of the existing initiatives in order to quickly incorporate new lessons learned into the existing and planned activities.

This section should detail which lessons learned can offer immediate assistance to existing initiatives, and how the existing initiative may benefit.

What suggested changes should be made to the control mechanisms or the initiative management? As initiatives progress it is expected that enhancements and changes to the control mechanisms and/or the initiative management processes and documents may be identified. This section should detail the suggested changes including why the change should be made and what benefit the change may provide. These changes should be reviewed and implemented if greater value can be obtained.

What has been the overall impact of the initiative on the portfolio of projects supporting a customer rule? This section details the impact the initiative has on the entire portfolio of projects supporting a customer rule. Some of the things to consider include:

Did successful execution of the initiative lower the risk of other initiatives in the portfolio? Has the entire risk associated with the portfolio increased or decreased?

Can the timelines associated with any other initiatives be shortened?

Can resources finishing up the initiative be utilized on other initiative teams?

Can another initiative be started in support of the customer rule?

Communication

What communication regarding the success of the initiative has been done? Successful initiatives can be communicated to the greater organization in order to maintain enthusiasm for additional initiatives. Describe what communication activities have been completed for the initiative.

Was obtaining buy-in and support for the initiative difficult or quickly obtained? Visible buy-in and support for the initiative from management as well as non-management is critical to the initiative success. This section describes the level of difficulty in securing the required support. This description should include the steps taken and the people involved.

What has been the feedback regarding the effectiveness and success of the initiative on enhancing the customer rule? Incorporating feedback into the communication process can enhance the acceptance of the changes made by the initiative. Collecting feedback and incorporating it into the messages being disseminated may allow the organization to keep a focus on the results. This section should describe the feedback that the initiative has received.

What additional action steps need to be taken to communicate the results of the initiative to the greater business population? An action plan could be developed to ensure the initiative is fully communicated. The information to be entered is as follows:

Action Step—This is the activity that can be performed

Desired Outcome—Describes the result that should be obtained from the Action Step;

Responsible—Identifies who is responsible for completing the Action Step;

Date to be Completed—Identifies the date by which the Action Step can be completed.

Ongoing Tracking

Upon completion of the Detailed Work plan, it is preferable to continue tracking the progress and success of the initiative. This should be done within the initiative management and be fed back into the overall framework to ensure success of the customer rule. This section describes those things that should continue to be tracked to highlight the success of the initiative. The fields to be completed include:

Activity/Outcome to Track—Identifies specific activities that may highlight the success of the initiative. The items in this category should be easy to review and have assigned measurements associated with them.

Reason—Describes why this Activity/Outcome should be tracked. This provides the rationale for this item.

How Measured—Describes how the item may be measured. This category can have specific metrics associated that can be tracked fairly easily. The detail should include where the information can be obtained, how often it should be reviewed, and the process for reviewing and measuring the Activity/Outcome.

Responsible—Identifies the person(s) responsible for tracking the initiative and its associated measurements.

Figure 20:
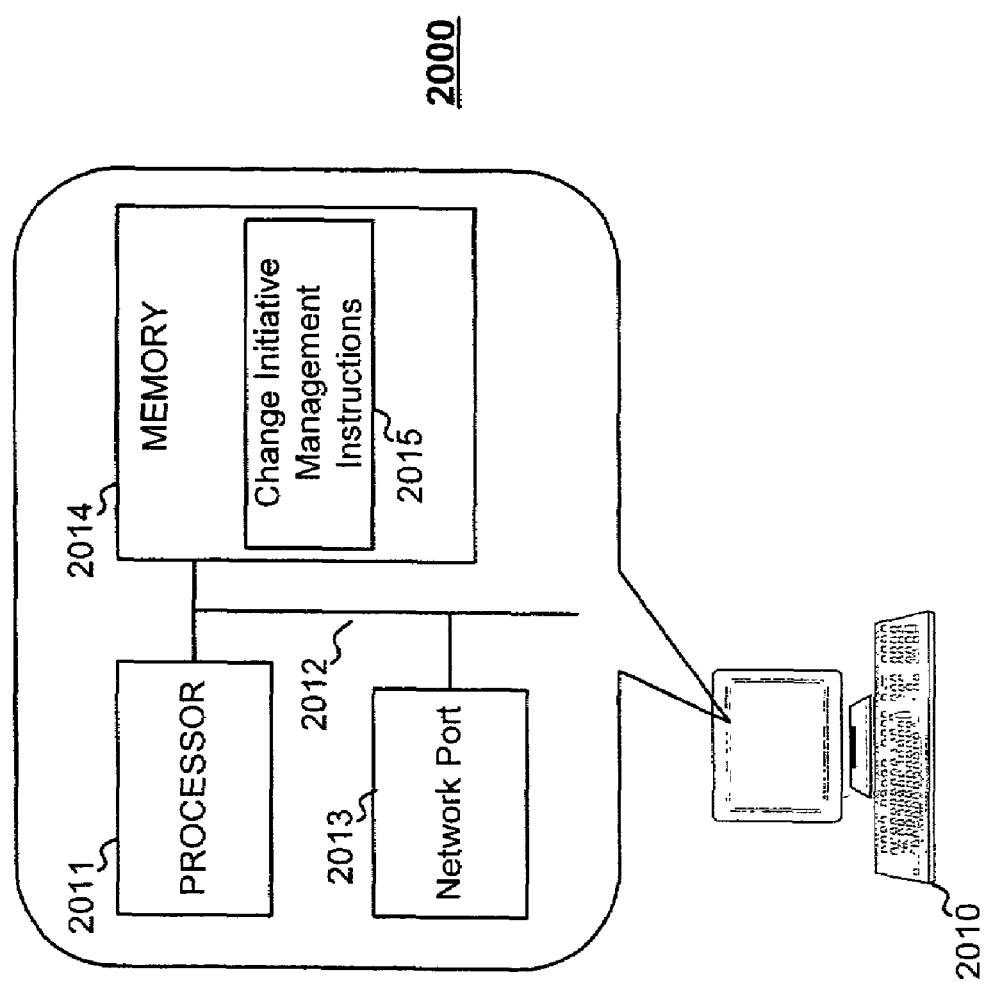
FIG. 20 illustrates a system in accordance with an embodiment of the present invention.

FIG. 20 illustrates a system in accordance with an embodiment of the present invention. System 2000, in an embodiment, includes a computer 2010 of a user. Computer 2010 can include a processor 2011 coupled via bus 2012 to network port 2013 and memory 2014. Processor 2011 can be, for example, an Intel Pentium® 4 processor, manufactured by Intel Corp. of Santa Clara, Calif. As another example, processor 2011 can be an Application Specific Integrated Circuit (ASIC). An example of bus 2012 is a peripheral component interconnect ("PCI") local bus, which is a high performance bus for interconnecting chips (e.g., motherboard chips, mainboard chips, etc.), expansion boards, processor/memory subsystems, and so on. Network port 2013 can be an Ethernet port, a serial port, a parallel port, a Universal Serial Bus ("USB") port, an Institute of Electrical and Electronics Engineers, Inc. ("IEEE") 1394 port, a Small Computer Systems Interface ("SCSI") port, a Personal Computer Memory Card International Association ("PCMCIA") port, and so on. Memory 2014 of computer 2010 can store a plurality of instructions configured to be executed by processor 2011. Memory 2014 may be a random access memory (RAM), a dynamic RAM (DRAM), a static RAM (SRAM), a volatile memory, a non-volatile memory, a flash RAM, polymer ferroelectric RAM, Ovonics Unified Memory, magnetic RAM, a cache memory, a hard disk drive, a magnetic storage device, an optical storage device, a magneto-optical storage device, or a combination thereof.

Memory 2014 stores instructions 2015 in computer readable fashion which can, at least in part, execute and in turn can at least in part manage performance of a method in accordance with an embodiment of the present invention. Such instructions can call for information to be entered into the computer 2010, or can direct the retrieval of the appropriate information. Further, in an embodiment of the present invention, the instructions can generate necessary documentation and deliver that documentation to the appropriate people.

Figure 21:
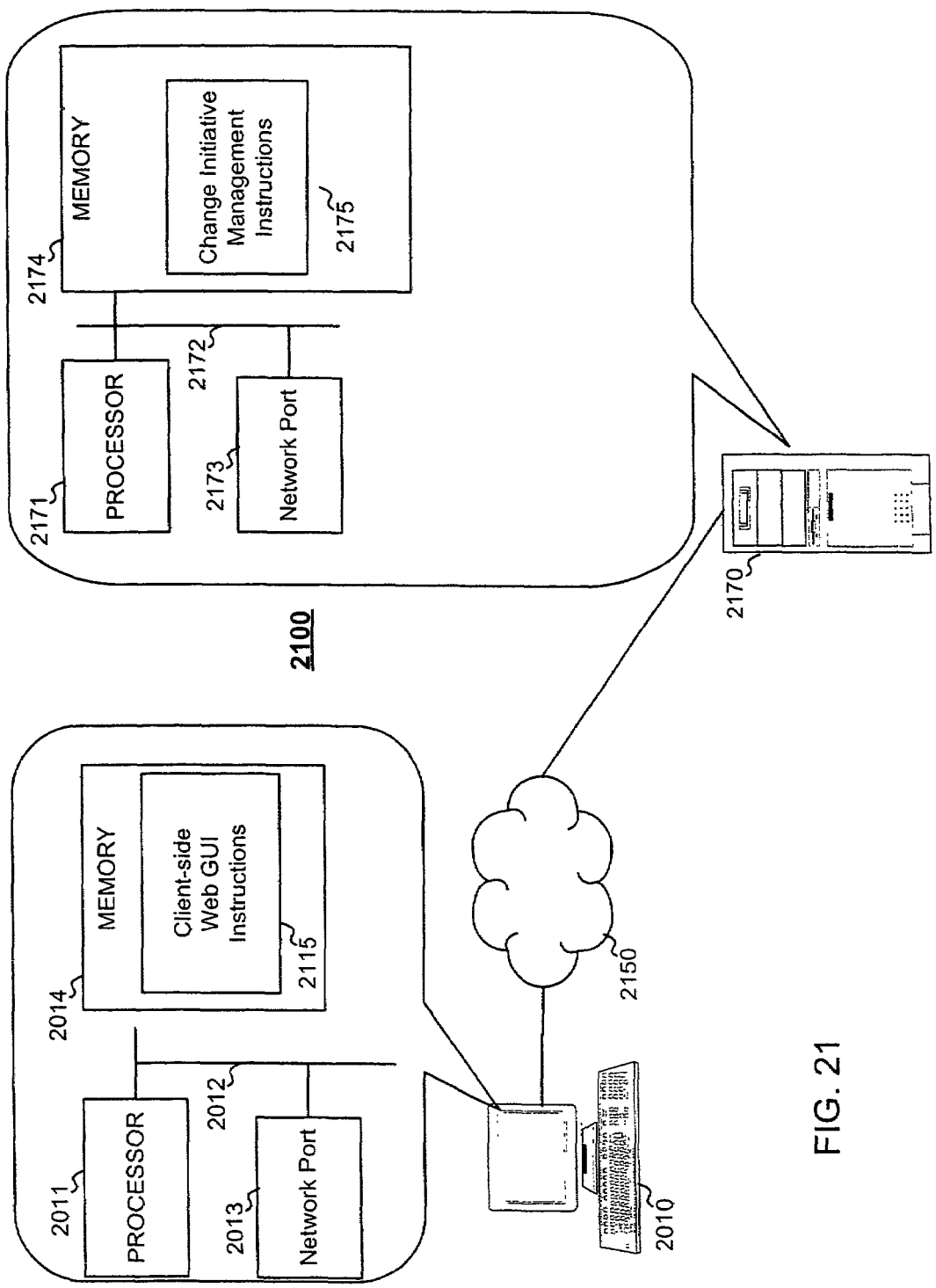
FIG. 21 illustrates another system in accordance with an embodiment of the present invention.

FIG. 21 illustrates another system in accordance with an embodiment of the present invention. System 2100, in an embodiment, includes a computer 2010 of a user. Computer 2010 can include a processor 2011 coupled via bus 2012 to network port 2013 and memory 2014. Computer 2010 can be coupled to a server 2170 via network 2150. Server 2170 can be, for example, a Windows NT server from Hewlett-Packard Company of Palo Alto, Calif., a UNIX server from Sun Microsystems, Inc. of Palo Alto, Calif., and so on. Server 2170 can include a processor 2171 coupled via bus 2172 to network port 2173 and memory 2174. Examples of network 2150 include a Wide Area Network (WAN), a Local Area Network (LAN), the Internet, a wireless network, a wired network, a connection-oriented network, a packet network, an Internet Protocol (IP) network, or a combination thereof. Memory 2174 stores instructions 2175 which can manage, at least in part the performance of a method in accordance with an embodiment of the present invention by calling for the input or retrieval of information, and storing information in a retrievable fashion.

Memory 2014 of computer 2010 can include web graphical user interface ("GUI") instructions 2115. In an embodiment, web GUI instructions 2115 can be client-side web GUI instructions (e.g., a web browser) that can manage at least in part communications between computer 2010 and server 2170 (e.g., a world wide web server, etc.). Examples of client-side web graphical user interface instructions include Internet Explorer 5.0 (or another version) from Microsoft Corporation of Redmond, Wash., Netscape Navigator 4.72 (or another version) from Netscape Communications of Mountain View, Calif., and so on.

In accordance with an embodiment of the present invention, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed. The terms "instructions configured to be executed" and "instructions to be executed" are meant to encompass any instructions that are ready to be executed in their present form (e.g., machine code) by a processor, or require further manipulation (e.g., compilation, decryption, or provided with an access code, etc.) to be ready to be executed by a processor.

Embodiments of systems and methods for change initiative management have been described. In the foregoing description, for purposes of explanation, numerous specific details are set forth to provide a thorough understanding of the present invention. It will be appreciated, however, by one skilled in the art that the present invention may be practiced without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the present invention.

In the foregoing detailed description, systems and methods in accordance with embodiments of the present invention have been described with reference to specific exemplary embodiments. Accordingly, the present specification and figures are to be regarded as illustrative rather than restrictive. The scope of the invention is to be defined by the claims appended hereto, and by their equivalents.

What is claimed is:

1. A computerized method for initiative management, the method comprising:
   identifying and defining an initiative;
   creating an initiative summary data record within a database of a computing device, the initiative summary data record including at least an initiative title, a customer rule, a project start date, a project end date, a main contact person, an initiative description with major milestones, organizations involved, management supporters, required resources, benefits, organizational areas of high impact, cost estimates to implement and barriers to success;
   developing an action plan via a graphical user interface (GUI), the action plan collecting information identifying required resources, identifying additional impacts on business, identifying any impacts of the business on the current initiative, identifying costs associates with the initiative and identifying any dependencies upon other initiatives;
   developing a business case within the database for the initiative, the business case including business case data record and an initiative scorecard, the business case data record including the initiative title, a supported business strategy, the purpose of the initiative, team members, impact on the business, impact on the customer and a cost-benefit analysis, and the initiative scorecard defining standardized metrics to evaluate the initiative performance against the action plan, against other initiatives and against the customer rules, the metrics being divided into financial metrics, internal processes, metrics, customer metrics, and learning and growth metrics;

generating an initiative plan for the initiative via the GUI, the initiative plan including an initiative risk assessment identifying and evaluating factors that effect the success of the initiative on both an initiative and a portfolio basis, each risk factor being assigned a level of severity, a probability of the risk factor occurring and a mitigation to reduce the severity, the probability or both;

a computer for managing execution of the initiative to satisfy the customer rules; and evaluating execution and management of the initiative for success as compared to the customer rules.

2. The method of claim 1, wherein the business case includes an impact assessment.

3. The method of claim 1, wherein evaluating execution and management of the initiative includes incorporating knowledge based at least in part on managing execution of the initiative.

4. The method of claim 1, wherein evaluating execution and management of the initiative includes generating a knowledge incorporation data record, the knowledge incorporation data record including one or more of an initiative assessment and an initiative portfolio assessment.

5. The method of claim 1, wherein identifying and defining the initiative includes generating an initiative summary.

6. The method of claim 1, wherein developing the business case includes determining a return on investment based at least in part on the initiative.

7. The method of claim 1, wherein generating the initiative plan includes generating a high level work plan.

8. The method of claim 7, wherein generating the initiative plan includes generating a detailed work plan.

9. The method of claim 1, wherein managing execution of the initiative includes determining initiative adjustments.

10. The method of claim 1, wherein the initiative scorecard comprises an initiative scorecard data record.

11. The method of claim 1, wherein the initiative scorecard data record includes one or more of a financial progress assessment, an internal processes progress assessment, a customer progress assessment, and a learning and growth progress assessment.

12. The method of claim 11, wherein the initiative scorecard data record further includes one or more of an initiative completion assessment and a percentage of budget utilized assessment.

13. The method of claim 1, wherein the initiative risk assessment comprises an initiative risk assessment data record.

14. A computerized system for change initiative management, the system comprising:

means for identifying and defining an initiative further comprising:

creating an initiative summary record within a database of a computing device, the initiative the initiative summary data record including at least an initiative title, a customer rule, a project start date, a project end date, a main contact person, an initiative description with major milestones, organizations involved, management supporters, required resources, benefits, organizational areas of high impact, cost estimates to implement and barriers to success, and developing an action plan, the action plan to collect information identifying required resources, identifying additional impacts on business, identifying any impacts of the business on the current initiative, identifying costs associates with the initiative and identifying any dependencies upon other initiatives;

means for generating an initiative business case coupled to the means for identifying and defining an initiative including a means for generating a business case data record and a means for generating an initiative scorecard, the business case data record including the initiative title, a supported business strategy, the purpose of the initiative, team members, impact on the business, impact on the customer and a cost-benefit analysis, and the initiative score card defining standardized metrics to evaluate the initiative performance against the action plan, against other initiatives, and against the customer rules, the metrics being divided into financial metrics, internal processes metrics, customer metrics, and learning and growth metrics;

means for generating an initiative plan coupled to the means for generating an initiative business case, the means for generating an initiative plan including the means for generating an initiative risk assessment data record further including a means for identifying and evaluating factors that effect the success of the initiative on both an initiative and a portfolio basis, each risk factor being assigned a level of severity, a probability of the risk factor occurring and a mitigation to reduce the severity, the probability or both;

means for managing execution of the initiative coupled to the means for generating the initiative plan; and means for closing and evaluating the initiative coupled to the means for management execution of the initiative.

15. The system of claim 14, wherein the means for generating an initiative business case includes one or more of a financial summary data record, a revenue pro forma data record, a revenue logic and assumptions data record, an expense pro forma data record, an expense logic and assumptions data record, a capital pro forma data record, and a capital logic and assumptions data record.

16. The system of claim 15, wherein the means for generating an initiative business case further includes one or more of an initiative scorecard data record and a portfolio scorecard data record.

17. The system of claim 14, wherein the means for generating an initiative plan includes one or more of a high-level work plan data record and a detailed work plan.

18. The system of claim 14, wherein the means for managing execution of the initiative includes an initiative assessment data record.

19. The system of claim 14, wherein the means for closing and evaluating the initiative includes one or more of an initiative review data record and a knowledge incorporation data record.

* * * * *